(12) United States Patent
Backus et al.

(10) Patent No.: US 12,736,177 B2
(45) Date of Patent: Sep. 15, 2026

(54) CONFIGURATIONS FOR GRIPS FOR PORTABLE HANDHELD DEVICES

(71) Applicant: ohSnap, Inc., Apex, NC (US)

(72) Inventors: Dale Christopher Backus, Broadway, NC (US); Eric Lucas Epstein, Durham, NC (US); David Paul Echem, Apex, NC (US); Peter James Diemer, Mocksville, NC (US)

(73) Assignee: ohSnap, Inc., Apex, NC (US)

( * ) Notice: Subject to any disclaimer, the term of this patent is extended or adjusted under 35 U.S.C. 154(b) by 319 days.

(21) Appl. No.: 18/403,624

(22) Filed: Jan. 3, 2024

(65) Prior Publication Data

US 2024/0219970 A1 Jul. 4, 2024

Related U.S. Application Data

(60) Provisional application No. 63/587,664, filed on Oct. 3, 2023, provisional application No. 63/478,414, filed on Jan. 4, 2023.

(51) Int. Cl.

*F16M 13/04* (2006.01)
*A45F 5/00* (2006.01)
*A45F 5/10* (2006.01)

(52) U.S. Cl.

CPC ............... *F16M 13/04* (2013.01); *A45F 5/10* (2013.01); *A45F 5/1516* (2025.01)

(58) Field of Classification Search

CPC ................................ A45F 5/10; A45F 5/1516
See application file for complete search history.

(56) References Cited

U.S. PATENT DOCUMENTS 3,426,384 A * 2/1969 Marton .............. B65D 25/2826 16/405
3,781,922 A 1/1974 Ericson
(Continued)

FOREIGN PATENT DOCUMENTS

CN 212990820 U 4/2021
CN 214204984 U 9/2021
(Continued)

OTHER PUBLICATIONS

U.S. Appl. No. 18/905,064, filed Oct. 2, 2024, Backus.
(Continued)

*Primary Examiner* — Justin M Larson
(74) *Attorney, Agent, or Firm* — Baker Botts L.L.P.

(57) ABSTRACT

In one embodiment, a grip for coupling to a portable handheld device includes a base, a cap assembly, and at least two flexure bearings connecting the base and the cap assembly. Each flexure bearing includes a cap attachment section, an upper arm section, a lower arm section, a base attachment section, an upper hinge, a middle hinge, and a lower hinge. The cap attachment section is attached to the cap assembly such that a distance $d_c$ is formed between the upper hinge and a centerline of the cap assembly. The base attachment section is attached to the base such that a distance $d_s$ is formed between the lower hinge and a centerline of the base. The distance $d_c$ is smaller than the distance $d_s$, and a length $L_c$ of the upper arm section is smaller than a length $L_s$ of the lower arm section.

21 Claims, 21 Drawing Sheets

(56) References Cited

U.S. PATENT DOCUMENTS 4,111,407 A 9/1978 Stager
5,788,493 A 8/1998 Tanaka
8,540,452 B2 9/2013 Jimenez
8,560,031 B2 10/2013 Barnett
8,919,838 B2 12/2014 Zimmermann
9,367,090 B2 6/2016 Barnett
9,486,910 B2 * 11/2016 Stevens .................. F16M 11/00
9,608,475 B1 3/2017 Karanikos
9,800,283 B2 10/2017 Schmidt
9,804,636 B2 10/2017 Barnett
D818,808 S 5/2018 Barnett
9,958,107 B1 5/2018 Hobbs
9,970,589 B2 5/2018 Hobbs
10,030,807 B1 7/2018 Hobbs
10,054,259 B2 8/2018 Hobbs
10,060,573 B2 8/2018 Hobbs
D835,091 S 12/2018 Torrance
10,200,518 B2 2/2019 Richter
10,215,329 B2 2/2019 Hobbs
10,314,376 B2 6/2019 Igarashi
10,317,005 B2 6/2019 Hobbs
10,386,009 B2 8/2019 Hobbs
10,389,860 B2 8/2019 Nahum
10,441,096 B2 * 10/2019 Chung .................. F16M 13/00
10,463,116 B2 11/2019 Barnett
10,568,410 B2 * 2/2020 Pierson .................. F16M 13/04
D878,039 S 3/2020 Cantoli-Alves
D879,086 S 3/2020 Nahum
10,617,187 B2 4/2020 Marvin
10,624,443 B2 4/2020 Haber
10,638,627 B1 4/2020 Stime
D883,273 S * 5/2020 Chen ............................ D14/251
10,655,775 B2 5/2020 Hobbs
10,724,280 B1 7/2020 Srour
10,742,251 B2 8/2020 Barnett
10,774,871 B1 9/2020 Srour
D901,483 S 11/2020 Kory
10,841,410 B2 11/2020 Nahum
D907,025 S 1/2021 Corraliza
10,897,984 B2 1/2021 Roth
10,972,596 B1 4/2021 Blau
D921,359 S 6/2021 Roth
11,051,592 B2 7/2021 Barnett
11,070,098 B2 7/2021 Ding
11,149,902 B2 10/2021 Barnett
D938,408 S 12/2021 Nahum
11,234,502 B2 2/2022 Van Geer
11,303,743 B2 4/2022 Chen
11,330,093 B2 5/2022 Backus
11,404,913 B2 8/2022 Nahum
11,425,976 B1 8/2022 Tran
11,445,055 B1 * 9/2022 Lin ......................... H04M 1/04
D967,813 S 10/2022 Von
D968,383 S 11/2022 Nahum
11,530,779 B2 12/2022 Epstein
11,611,238 B2 3/2023 Nahum
11,671,527 B2 6/2023 Parish, Sr.
11,710,988 B2 * 7/2023 Larsson ................ H02J 50/005 320/108
11,786,031 B1 10/2023 Backus
11,839,279 B2 * 12/2023 Wulff .................... H01F 7/0252
11,976,785 B2 * 5/2024 Lane .................. F16M 11/2092
11,988,325 B2 * 5/2024 Lane ...................... F16M 11/38
12,016,450 B2 6/2024 Backus
12,146,614 B2 * 11/2024 Snow ..................... F16M 13/04
12,313,216 B2 * 5/2025 Wang ..................... F16M 11/10
D1,090,522 S * 8/2025 Huang ......................... D14/253
D1,099,883 S * 10/2025 Lin ............................. D14/253
2007/0206275 A1 9/2007 Hemmer
2008/0023508 A1 * 1/2008 Harchol ................... A45F 5/02 224/183
2010/0051483 A1 3/2010 Mastrodonato
2010/0072334 A1 3/2010 Le Gette
2011/0192857 A1 * 8/2011 Rothbaum ........... F16M 11/041 248/220.21
2011/0216933 A1 9/2011 Lan
2013/0098777 A1 4/2013 Gaustad
2013/0126691 A1 5/2013 Miklas
2015/0060307 A1 3/2015 Barnett
2015/0172431 A1 6/2015 Huang
2015/0214993 A1 7/2015 Huang
2015/0380139 A1 12/2015 Hsu
2016/0069512 A1 3/2016 Grieve
2016/0150861 A1 * 6/2016 Yao ...................... F16M 11/105 224/245
2016/0282907 A1 9/2016 Barnett
2017/0318697 A1 11/2017 Lebovitz
2017/0338676 A1 11/2017 Yan
2018/0051851 A1 2/2018 Hobbs
2018/0146078 A1 5/2018 Shin
2018/0280706 A1 10/2018 Maile
2018/0338593 A1 11/2018 Scharnigg
2018/0348541 A1 12/2018 Radzwill
2019/0211966 A1 7/2019 Nahum
2019/0215387 A1 7/2019 Chiang
2019/0215391 A1 7/2019 Chiang
2019/0285223 A1 9/2019 Hobbs
2019/0296788 A1 9/2019 Zavala
2019/0335031 A1 10/2019 Nahum
2019/0379240 A1 12/2019 Liu
2020/0140168 A1 5/2020 Chiang
2020/0162594 A1 5/2020 Cantoli-Alves
2020/0237310 A1 7/2020 Lozano-Buhl
2020/0314070 A1 10/2020 Barnett
2020/0326030 A1 * 10/2020 Surani ................... G06F 1/1632
2020/0349873 A1 11/2020 Nahum
2020/0380642 A1 12/2020 Nahum
2021/0002029 A1 1/2021 Barnett
2021/0075255 A1 3/2021 Nutting
2021/0082125 A1 3/2021 Nahum
2021/0120942 A1 4/2021 Cantoli-Alves
2021/0124395 A1 4/2021 Barnett
2021/0140580 A1 5/2021 Nahum
2021/0218277 A1 7/2021 Nahum
2021/0301976 A1 9/2021 Cohen
2021/0315366 A1 10/2021 Licitra
2021/0337945 A1 11/2021 Popoff
2021/0348716 A1 11/2021 Lane
2021/0359549 A1 11/2021 Nahum
2021/0383966 A1 12/2021 Ren
2022/0085231 A1 3/2022 Liu
2022/0096949 A1 3/2022 Cantoli-Alves
2022/0103667 A1 3/2022 Chiang
2022/0116491 A1 4/2022 Chiang
2022/0130229 A1 4/2022 Barnett
2022/0159113 A1 5/2022 Parish
2022/0183431 A1 6/2022 Chiang
2022/0206532 A1 6/2022 Barnett
2022/0304433 A1 9/2022 Smith
2022/0304457 A1 9/2022 Cornish
2022/0344975 A1 10/2022 Chang
2022/0345560 A1 10/2022 Backus
2022/0403971 A1 12/2022 Von
2023/0136304 A1 5/2023 Nutting
2023/0157430 A1 5/2023 Backus
2023/0261520 A1 8/2023 Mora
2024/0053840 A1 2/2024 Barnett
2024/0218970 A1 7/2024 Backus
2024/0219970 A1 * 7/2024 Backus .................. F16M 13/04
2024/0250708 A1 7/2024 Fong et al.
2024/0263734 A1 8/2024 Lane et al.
2025/0057304 A1 * 2/2025 Backus ................... G06F 1/166
2025/0107615 A1 * 4/2025 Backus ................ F16M 11/041
2025/0116371 A1 * 4/2025 Lane ...................... F16M 13/00

FOREIGN PATENT DOCUMENTS

CN 215646902 U 1/2022
CN 216121856 U 3/2022
CN 217470027 U 9/2022
CN 220570364 U 3/2024

(56) References Cited

FOREIGN PATENT DOCUMENTS

| | | | |
|---|---|---|---|
| KR | 20220068192 | A | 5/2022 |
| WO | WO 2022159656 | A1 | 7/2022 |

OTHER PUBLICATIONS

U.S. Appl. No. 18/816,545, filed Aug. 27, 2024, Echem.
U.S. Appl. No. 18/747,940, filed Jun. 19, 2024, Diemer.
U.S. Appl. No. 18/487,535, filed Oct. 16, 2023, Backus.
International search report and Written Opinion received for PCT Application No. PCT/US24/10322, 15 pages.
International search report and Written Opinion received for PCT Application No. PCT/US2024/049772, mailed on Nov. 7, 2024, 10 pages.
Ohsnap, "How it's Made: Phone Grips", video published on Aug. 22, 2024, access via https://www.youtube.com/watch?v=95azax3-41E, 1 page.

* cited by examiner 112
146
143
θ
144
114

CONFIGURATIONS FOR GRIPS FOR PORTABLE HANDHELD DEVICES

PRIORITY

This application claims the benefit under 35 U.S.C. § 119(c) of U.S. Provisional Patent Application No. 63/478,414, filed 4 Jan. 2023, and U.S. Provisional Patent Application No. 63/587,664, filed 3 Oct. 2023, each of which is incorporated herein by reference.

TECHNICAL FIELD

This disclosure generally relates to physical accessories for portable handheld devices and, more particularly, to grips for portable handheld devices.

BACKGROUND

Portable electronic devices (e.g., smartphones, tablets, laptop computers, smart watches, e-readers, music players, fitness trackers, handheld gaming consoles, etc.) have become ubiquitous in modern society. These devices are often sized to be carried in one hand and manipulated with either hand. However, frequent use can lead to hand cramping or discomfort. To address these or other challenges, accessories have been developed to case the burden of carrying and using these portable electronic devices. One such accessory (commonly referred to as a "grip" or a "finger grip") can be attached to a device or case, offer drop protection, and provide a more comfortable and functional means of holding the device.

Wireless charging, such as the QI wireless power transfer standard, has become increasingly popular in recent years, especially for smartphone charging. These devices utilize an alternating current charging base station that can be powered by a household power supply. The charging base station may include a transmitter coil, which can generate a magnetic field that induces a receiver coil inside of a smartphone and is known as magnetic resonance charging. Conventional finger grips are often too thick to allow wireless charging therethrough. To that end, when charging is desired, many users continue to opt for a plug-in charger or choose to physically remove the finger grip to enable wireless charging. These options are burdensome and undesirable.

SUMMARY OF PARTICULAR EMBODIMENTS

This disclosure presents a grip for portable electronic devices. The grip according to this disclosure may be sufficiently thin to maintain inductive coupling between a wireless charging transmitter and receiver, allowing for wireless charging in the presence of the grip. This may add convenience of leaving the grip attached to the electronic device while allowing for efficient wireless charging. Moreover, the grip may be manipulated by a user between multiple positions and configurations such as a non-captured position, a captured position, and a stand position, increasing ease of operation, user comfort, and so forth. For example, the user may deploy, collapse, or otherwise operate the grip single-handedly in a simple and intuitive manner, significantly improving user experience.

In particular embodiments, the devices described herein relate to a grip for coupling to a portable handheld device. The grip includes a base, a cap assembly, and at least two flexure bearings connecting the base and the cap assembly. Each flexure bearing includes a cap attachment section, an upper arm section, a lower arm section, a base attachment section, an upper hinge connecting between the cap attachment section and the upper arm section, a middle hinge connecting between the upper arm section and the lower arm section, and a lower hinge connecting between the lower arm section and the base attachment section. The cap attachment section is attached to the cap assembly such that a distance $d_c$ is formed between the upper hinge and a centerline of the cap assembly. The base attachment section is attached to the base such that a distance $d_s$ is formed between the lower hinge and a centerline of the base. The distance $d_c$ is smaller than the distance $d_s$, and a length $L_c$ of the upper arm section is smaller than a length $L_s$ of the lower arm section.

In particular embodiments, the distance $d_c$, the distance $d_s$, the length $L_c$, and the length $L_s$ satisfy:

$$\text{abs}(L_s - L_c - d_s + d_c) \leq 5\ \text{mm}.$$

In particular embodiments, when $d_s = d_c$, then:

$$30\ \text{mm} > L_s + L_c > 15\ \text{mm}.$$

In particular embodiments, when $d_s \neq d_c$, then:

$$30\ \text{mm} > \sqrt{(L_c + L_s)^2 - (d_s - d_c)^2}.$$

In particular embodiments, the length $L_c$ has a value ranging from 2 mm to 25 mm. The length $L_s$ has a value ranging from 2 mm to 25 mm. The distance $d_s$ has a value ranging from 5 mm to 25 mm. The distance $d_c$ has a value ranging from 5 mm to 25 mm.

In particular embodiments, the cap assembly is configured to be movable relative to the base to a non-captured position in which the cap assembly is spaced from the base. When in the non-captured position, the at least two flexure bearings are configured to be movable between a first position in which the middle hinges bend inward toward each other, and a second position in which the middle hinges bend outward away from each other.

In particular embodiments, the base includes a tab or a slot. The cap assembly is configured to be movable relative to the base to a stand position in which an edge of the cap assembly is engaged with the tab or the slot of the base.

In particular embodiments, the cap assembly includes a first plate and a second plate coupled to the first plate.

In particular embodiments, the first plate and the second plate are coupled together by ultrasonic welding.

In particular embodiments, at least a portion of the cap attachment section of the flexure bearing is held between the first plate and the second plate.

In particular embodiments, the cap assembly includes a sloped portion that faces the base.

In particular embodiments, the cap assembly is configured to be movable relative to the base such that when the sloped portion moves to contact the base, the sloped portion initiates a lever action.

In particular embodiments, each flexure bearing is configured to resiliently extend to move the cap assembly away from the base upon the lever action.

In particular embodiments, the base includes a sloped portion that faces the cap assembly.

In particular embodiments, the cap assembly is configured to be movable relative to the base such that when the cap assembly moves to contact the sloped portion of the base, the sloped portion initiates a lever action.

In particular embodiments, the base is rotatably coupled to a frame. The frame is configured for coupling to the portable handheld device.

In particular embodiments, the base is coupled to the frame via a groove-and-protrusion assembly.

In particular embodiments, the base is magnetically coupled to the frame via one or more poly magnets. The base is rotatable to a plurality of discrete positions relative to the frame.

In particular embodiments, the base is removably coupled to the frame.

In particular embodiments, the frame is made of highly conductive metal.

In particular embodiments, the cap assembly includes one or more location-indicating nubs configured to provide tactile feedback to a user.

In particular embodiments, each location-indicating nub includes a spring mechanism that is configured to allow the location-indicating nub to deflect into the cap assembly.

In particular embodiments, the centerline of the cap assembly extends parallel to the upper hinge, and the centerline of the base extends parallel to the lower hinge.

In particular embodiments, the devices described herein relate to a grip for coupling to a portable handheld device. The grip includes a base having a first magnetic component, a cap assembly having a first plate, a second plate coupled to the first plate, and a second magnetic component, and at least two flexure bearings connecting the base and the cap assembly. At least a portion of each flexure bearing is held between the first plate and the second plate. The first magnetic component and the second magnetic component are configured to attract at a first threshold distance to magnetically couple the cap assembly and the base together, and to repel or not attract at a second threshold distance to push the cap assembly away from the base. Each of the first magnetic component and the second magnetic component includes a plurality of poles and has a particular magnetic strength. Each of the first magnetic component and the second magnetic component is configured to maintain inductive coupling between the portable handheld device and a wireless charger.

In particular embodiments, the first magnetic component and the second magnetic component are uncoated.

In particular embodiments, the first magnetic component and the second magnetic components are coated in non-conductive material.

In particular embodiments, each of the plurality of poles has a different polarity from an adjacent pole.

In particular embodiments, each of the first magnetic component and the second magnetic component includes a poly magnet.

In particular embodiments, each of the first magnetic component and the second magnetic component includes a plurality of magnet segments.

In particular embodiments, each of the plurality of magnet segments is configured end-to-end with an adjacent magnet segment.

In particular embodiments, the plurality of magnet segments is arranged in a particular grid shape.

In particular embodiments, the first magnetic component is configured near a center of the base. The second magnetic component is configured near a center of the cap assembly.

In particular embodiments, the first magnetic component is configured around a perimeter of the base. The second magnetic component is configured around a perimeter of the cap assembly.

In particular embodiments, the second magnetic component is held between the first plate and the second plate of the cap assembly.

In particular embodiments, the first plate and the second plate are welded together.

In particular embodiments, the base is rotatably coupled to a frame. The frame is configured for coupling to the portable handheld device.

In particular embodiments, the first magnetic component is configured in the base.

In particular embodiments, the frame is made of highly conductive metal.

In particular embodiments, the cap assembly is configured to be movable relative to the base to a non-captured position in which the cap assembly is spaced from the base, and a captured position in which the cap assembly contacts the base.

In particular embodiments, when in the captured position, the first magnetic component and the second magnetic component are configured to be separated from each other by a predetermined distance.

In particular embodiments, the predetermined distance is about 0 to 3 mm.

In particular embodiments, each of the first magnetic component and the second magnetic component is grade N48, N52, N54H, or N54M.

In particular embodiments, each of the first magnetic component and the second magnetic component is a neodymium magnet, a ferrite magnet, or a samarium cobalt magnet.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
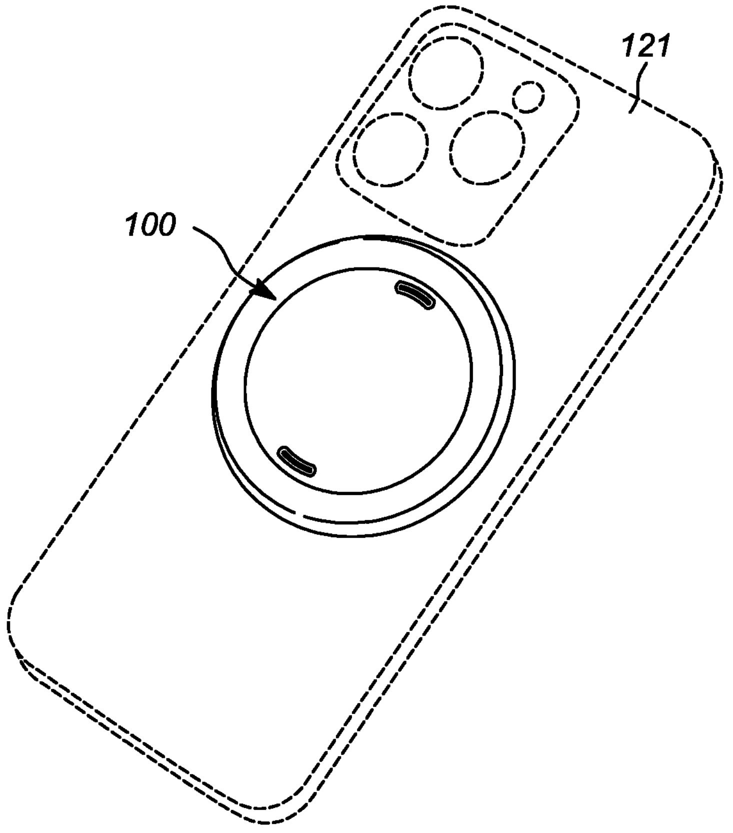
FIG. 1 illustrates an environmental view of an example finger grip according to this disclosure.

The embodiments disclosed herein relate to a grip for portable electronics. As appreciated by the present inventors, finger grips can be uncomfortable, lack enhanced functionality, and/or do not support wireless charging therethrough.

The embodiments disclosed herein substantially improve finger grips for portable electronics and other portable devices. Specifically, the embodiments disclosed herein provide for a finger grip that may collapse to the point where its profile is sufficiently thin to maintain inductive coupling between a wireless charging transmitter and receiver, allowing for wireless charging in the presence of the grip. In this way, the finger grip may be MAGSAFE, QI, and/or QI 2 compliant. By permitting wireless charging through the finger grip itself, wireless charging accessibility is greatly improved.

Furthermore, the embodiments disclosed herein provide for a grip that may be movable between a plurality of configurations or positions. In particular embodiments, the finger grip may be movable between at least four positions. As an example, the finger grip can be manipulated into a compact, low-profile position (referred to as a "captured position"), a position offering dynamically resizable finger openings (referred to as a "non-captured position"), a position for propping a portable device up on a surface (referred to as a "stand position"), a position for resting the finger on one side of the grip (referred to as a "shelf position"), to name a few. As another example, when in the non-captured position, the finger grip may be manipulated into multiple configurations, such as one-finger mode (where a user engages the finger grip using a single finger) and two-finger mode (where a user engages the finger grip using two or more fingers.) As a further example, the finger grip may be manipulated into any suitable number of configurations or positions. Furthermore, embodiments disclosed herein provide for a finger grip that implements one or more flexure bearings, which facilitates comfort and case of use by facilitating movement into any of the plurality of configurations or positions. By enabling multiple positions, the finger grip advantageously improves functionality and comfort, among other improvements. Still further, embodiments disclosed herein provide for various relationships of flexure bearing geometry, mold conditions, and material chemistry. For example, in order for the finger grip to work in such a simple manner and transition smoothly across the plurality of configurations or positions, a combination of features may be provided.

In particular embodiments, the finger grip may be operated to open to its non-captured position. Opening the finger grip may be done by multiple methods as desired, which may include slide-to-open (the user may press and slide forward a cap of the grip to open), pry-to-open (the user may pull an edge of the cap to release it), press-to-open (the user may press anywhere along an edge of the cap to pop up the cap), etc. As an example and not by way of limitation, the flexure bearing may be configured to naturally desire to be in a semi-open state, even after it sits in the captured state for a long period of time. This may be useful if the product travels overseas to its ultimate destination to a customer which can take months. This way, when the user ultimately tries to press to open the finger grip, it does so. Moreover, the finger grip configured according to this disclosure may allow the user to easily deploy the finger grip by operating on a portion of a cap of the finger grip simply using one finger. For example, the portion of the cap may be referenced in any suitable way to alert the user (i.e., on a cap nub). In particular embodiments, deploying the finger grip may involve different features or combinations of features of the finger grip such as the flexure bearings, the magnetic components, the slope portion(s) of the cap and/or a base, etc., which may work individually or cooperate with one another to cause the cap to separate from the base of the finger grip and signals the deployment of the finger grip. This single-action deployment (e.g., simply by using one finger) is easy to use and requires no additional effort, making it ergonomic and convenient compared to other finger grips that may require multiple hands or actions.

In particular embodiments, the finger grip may be pushed or otherwise operated to close to its captured position. As an example and not by way of limitation, the finger grip may close with a simple press of the cap of the finger grip until the cap makes contact with the base of the finger grip. Alternatively, the finger grip may close automatically when the user removes the finger. As another example, the limited thickness requirements of the finger grip (e.g., <2.5 mm and someday maybe less) means a limited amount of magnetism (which may be what holds the finger grip closed or captured) can ever be deployed. A problem arises when the finger grip stays open or non-captured for a long period of time (the inverse of the push-to-open problem). When left open or in stand mode for several hours, this new open state is adopted by the flexure bearing and now the magnets may not be strong enough to hold the finger grip closed on the first attempt. Usually this may be resolved by simply holding the cap closed for as little as a full second. In particular embodiments, there may be a very steep logarithmic curve for how the flexure bearing adopts memory.

In particular embodiments, the finger grip may slide or otherwise be operated into a stand or shelf mode. As an example, engaging the stand may be a simple and intuitive motion. For instance, the user may locate one of the cap nubs and slide the cap towards the opposite nub until the cap does not go any further and engages with the base, details of which will be more fully described below.

In particular embodiments, the finger grip may be used in one-finger mode, e.g., when the finger grip is in the non-captured position. As an example and not by way of limitation, the flexure bearing may be made malleable enough that the flexure bearing deflects easily and naturally when the user's finger begins to penetrate a lower gap of the flexure bearing. As another example, the flexure bearing may revert to its "inward bend" state when the finger is removed, so the flexure bearing may fold properly when trying to close. Configured as such, the embodiments may provide a simple structure and avoid overly complicated mechanisms to achieve the desired functionality.

FIG. 1 illustrates an environmental view of an example finger grip according to this disclosure. In particular embodiments, the finger grip 100 may be magnetically and/or adhesively adherable to a portable device such as a smartphone 121 to provide an easily deployable tool for holding the portable device with one or more fingers.

The particular implementation of the finger grip 100 may vary across embodiments. For example, in some cases, as illustrated in FIG. 1, the finger grip 100 may be implemented as a standalone accessory that is attachable to a portable device, such as the smartphone 121 or a case for the smartphone 121. In some cases, the finger grip 100 may be compatible with particular brands or models and incompatible with other brands or models. For example, the finger grip 100 may be compatible with an APPLE device (e.g., an IPHONE) and incompatible with an ANDROID device (e.g., a SAMSUNG GALAXY), or compatible with an ANDROID device and incompatible with an APPLE device. Alternatively, in some cases, the finger grip 100 may be universally compatible with multiple (or all) brands or models (e.g., both APPLE and ANDROID devices). As another example, in some cases, the finger grip 100 may be integrated with or part of the portable device. For example, the finger grip 100 may be integrated into a smartphone case or the smartphone 121 itself.

Although illustrated as installed on a smartphone 121, it will be appreciated that the finger grip 100 may be removably coupled to any of various portable devices to assist in holding the device. For example, a back surface of the finger grip 100 may be attachable to a portable electronic device (e.g., a game device, a cell phone, an e-reader, a smartphone, a tablet, a personal computer, a laptop, a television, a car console display, a personal digital assistant (PDA), smart glasses, a monitor) or another portable object (e.g., a book, a notepad, a soda can, a coffee mug, etc.) using magnets, adhesives, etc. As an example and not by way of limitation, the finger grip 100 may be attachable by way of a nano and/or removable adhesive. Furthermore, a front surface of the finger grip 100 may be attachable to ferrous metal and magnetic surfaces (e.g., refrigerators, gym equipment, car, chargers, desk mounts, etc.) using magnets.

Figure 2:
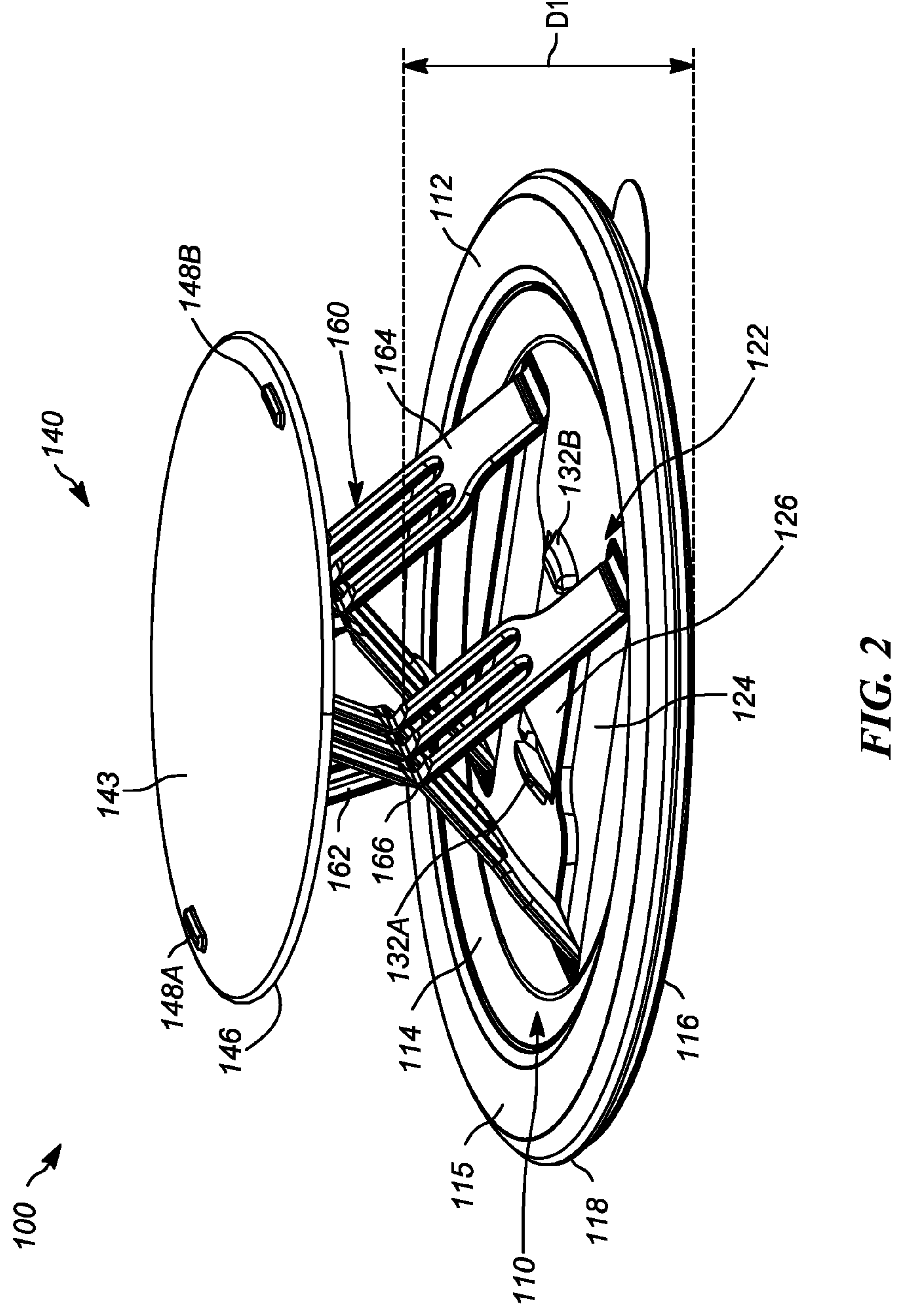
FIGS. 2-4 illustrate perspective views of the finger grip of FIG. 1 positioned in a non-captured position.
Figure 3:
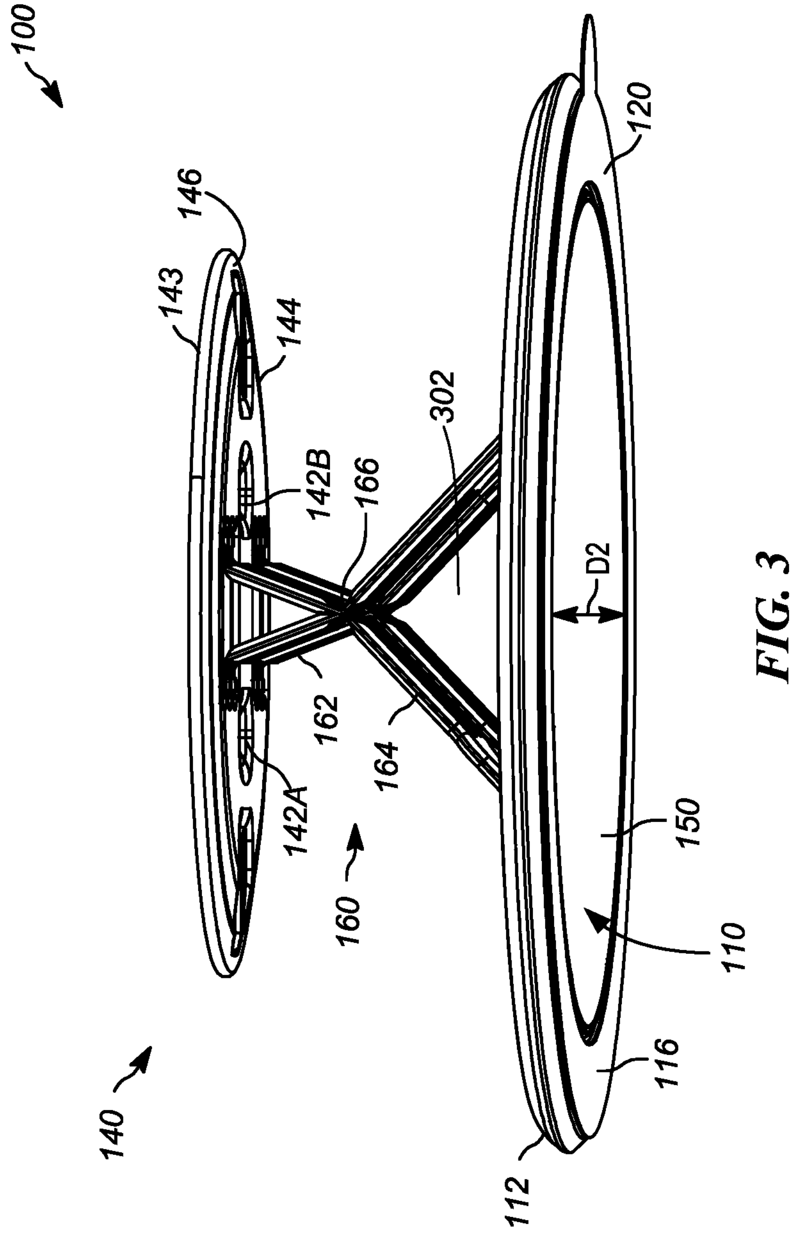
Figure 4:
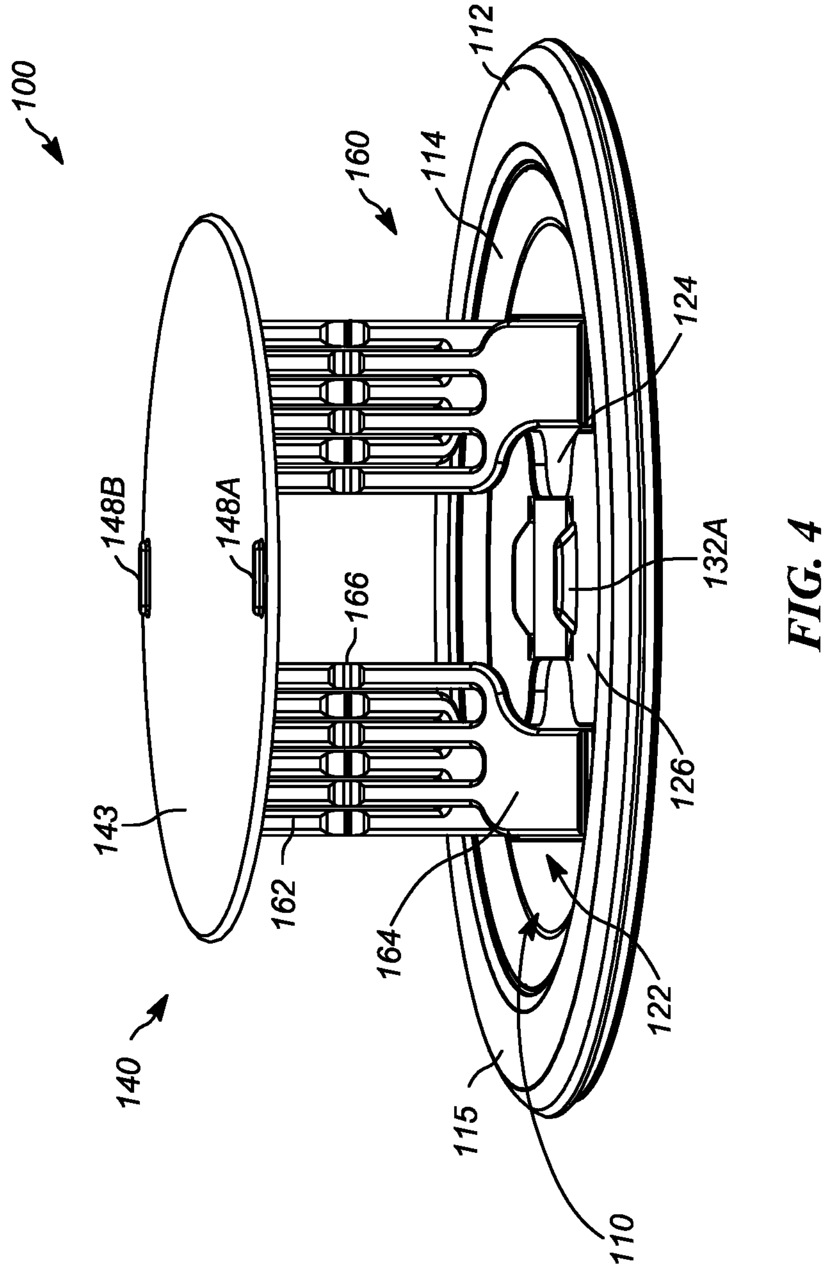

FIGS. 2-4 illustrate perspective views of the finger grip 100 of FIG. 1 positioned in a non-captured position. The finger grip 100 may include a base 110, a cap assembly 140, and at least two flexure bearings 160. In the non-captured position, the cap assembly 140 may be spaced from the base 110. In particular embodiments, the cap assembly 140 may include two plates (e.g., an upper first plate and a lower second plate) that are coupled together, for example, by ultrasonic welding, friction welding, heat staking, molding, or other suitable methods, details of which are more fully described below. In particular embodiments, the base 110 may include multiple components such as a hub, a retainer plate, etc., details of which are more fully described below. Alternatively, in particular embodiments, the base 110 may be a single integrated component. It will be appreciated that the finger grip 100 represents an example finger grip and other examples may use fewer, additional, or different components or arrangements.

In particular embodiments, the base 110 may include a hub 114 that is rotatably coupled to a frame 112. For example, the base 110 may be a separate component from the frame 112. In particular embodiments, the frame 112 may be configured for coupling to the smartphone 121. For example, the base 110 may not be coupled to the smartphone 121. In the illustrated example, the frame 112 may be configured as a ringlike member having an exterior edge with an outer diameter, D1, and an interior edge with an inner diameter, D2. D1 and D2 may vary across embodiments. For example, D1 or D2 may be in a range between about 30 mm and about 70 mm, between about 40 mm and about 60 mm, or between about 45 mm and about 55 mm. As another example, D1 or D2 may be greater than 30 mm, greater than 40 mm, greater than 50 mm, greater than 60 mm, greater than 70 mm, less than 30 mm, less than 40 mm, less than 50 mm, less than 60 mm, or less than 70 mm. As another example, D1 or D2 may be about 40, 42.5, 45, 47.5, 50, 52.5, 55, 57.5, 60, 62.5 or 65 mm (+/−about 1 mm).

The shape of the frame 112 may vary across embodiments. For example, in some cases, the interior edge and/or the exterior edge of the frame 112 may be relatively rectangular, elliptical, triangular, polygonal, non-polygonal, or irregular in shape. In some cases, the interior edge and/or the exterior edge of the frame 112 may be complementary to the geometry of a magnetic component located in an electronic device for facilitating a magnetic connection to the electronic device. For example, an electronic device may include a circular array of magnets (e.g., having an outer diameter of about 56-58 millimeters and an inner diameter of about 45-46 millimeters). The interior edge and/or the exterior edge of the frame 112 may have a shape that is complementary to the outer and/or inner diameter of the magnets. By configuring the frame 112 with a shape that is complementary to the circular array of magnets in the electronic device, the finger grip 100 may maintain a modest size, while remaining large enough to magnetically couple to the electronic device using its magnets. In some cases, the base 110 may have a shape that is complementary to the shape of the electronic device. In some cases, as described herein, the base 110 may have an interior shape that is complementary to a shape of the cap assembly 140.

The thickness of the frame 112 may vary across embodiments. For example, the thickness may be in a range between about 1 mm and about 4.5 mm, between about 1 mm and about 3.5 mm, or between about 1.25 mm and about 1.75 mm. As another example, the thickness may be less than 4.5 mm, less than 4 mm, less than 3.5 mm, less than 3 mm, less than 2.5 mm, less than 2 mm, less than 1.5 mm, less than 1 mm, or less than 0.5 mm. As another example, the thickness may be about 0.5, 0.75, 1, 1.25, 1.5, 1.75, 2, 2.25, 2.5, 2.75, 3, 3.25, 3.5, 3.75, 4, 4.25, 4.5, 4.75, or 5 mm (+/−about 0.05 mm).

In particular embodiments, the frame 112 may include a first side 115, a second side 116, and a transitional edge 118 between the first side 115 and the second side 116. In particular embodiments, the transitional edge 118 may have a curved (e.g., convex) profile that connects the first side 115 and the second side 116. As an example, due to the transitional edge 118, an outer perimeter of the first side 115 may be substantially equal to an outer perimeter of the second side 116. In some cases, the curvature of the transitional edge 118 makes it easier for a user to disengage the frame 112 (and thus the finger grip 100) from an electronic device. For example, the transitional edge 118 may create a small gap under an edge of the frame 112, under which a user may insert a fingernail (or other similarly sized object) when disengaging the finger grip 100 from the electronic device. Alternatively, in particular embodiments, the transitional edge 118 may be configured such that the outer perimeter of the first side 115 is different from (e.g., smaller than) the outer perimeter of the second side 116. The transitional edge 118 may be implemented in a variety of ways. For example, in some cases, the transitional edge 118 includes a tapered side wall. As another example, the transitional edge 118 may include a chamfered edge or a filleted edge. In particular embodiments, the transitional edge 118 may be used to firmly mount additional accessories to the finger grip 100, which include but not limited to "hard" mounts such as bike mounts or car mounts that grasp the transitional edge 118 for a firm lock to prevent the additional accessories from being removed from the finger grip 100.

In particular embodiments, at least a portion of the second side 116 (sometimes referred to as the back side) of the frame 112 may include an adhesive layer 120. The adhesive layer 120 may include an adhesive, such as a double-sided adhesive substrate or a nano adhesive layer, for aiding in attachment of the finger grip 100 to an electronic device or other object. In some cases, the adhesive layer 120 may work in tandem with a magnetic connection to couple the finger grip 100 to an electronic device or other object. In this way, the adhesive layer 120 may strengthen the coupling between the finger grip 100 and the electronic device, as compared to an entirely magnetic coupling.

Figure 5:
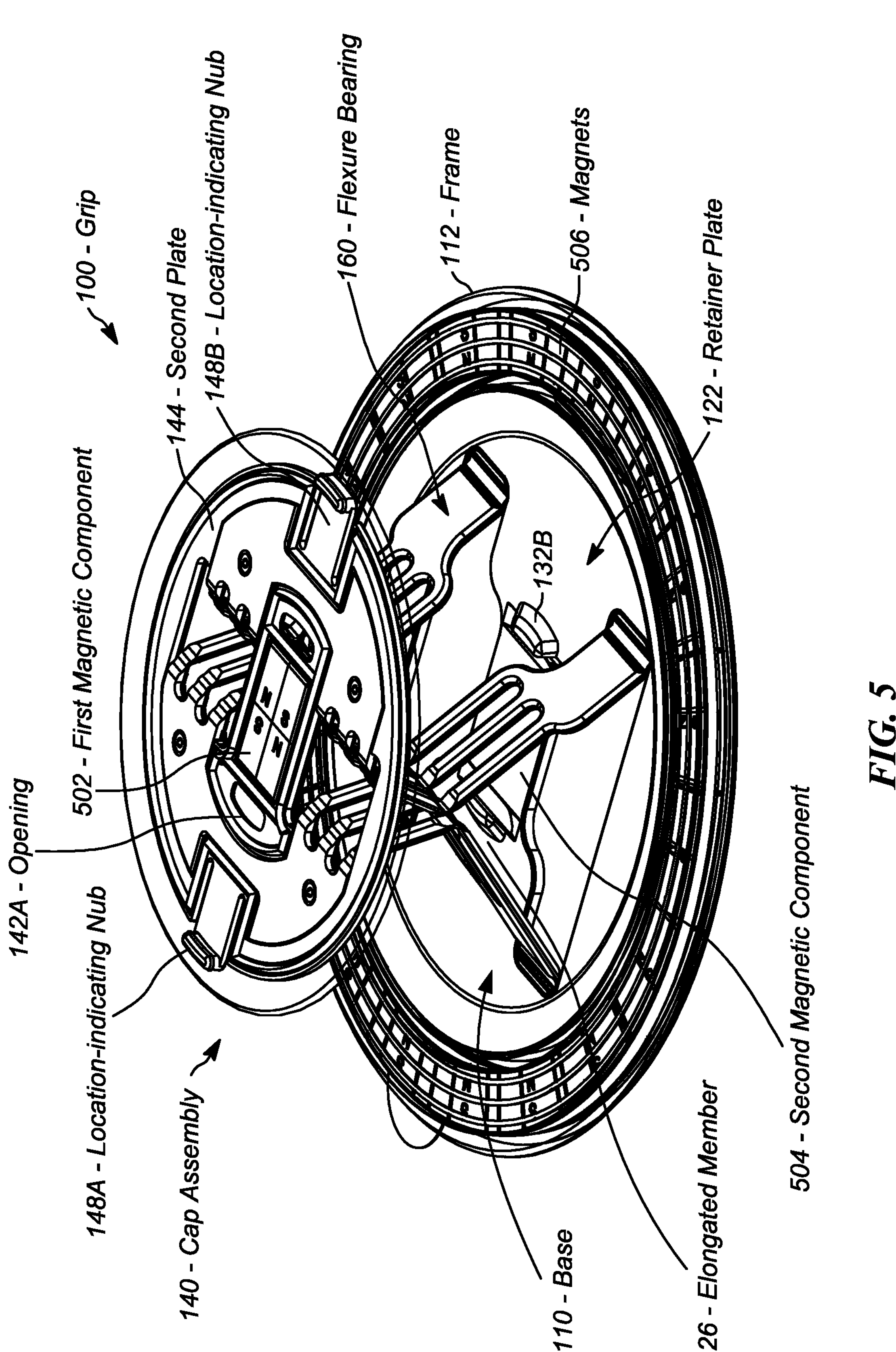
FIGS. 5 and 6 illustrate example internal structures of the finger grip of FIG. 1 in the non-captured position, with particular external structures removed for illustration purposes.
Figure 6:
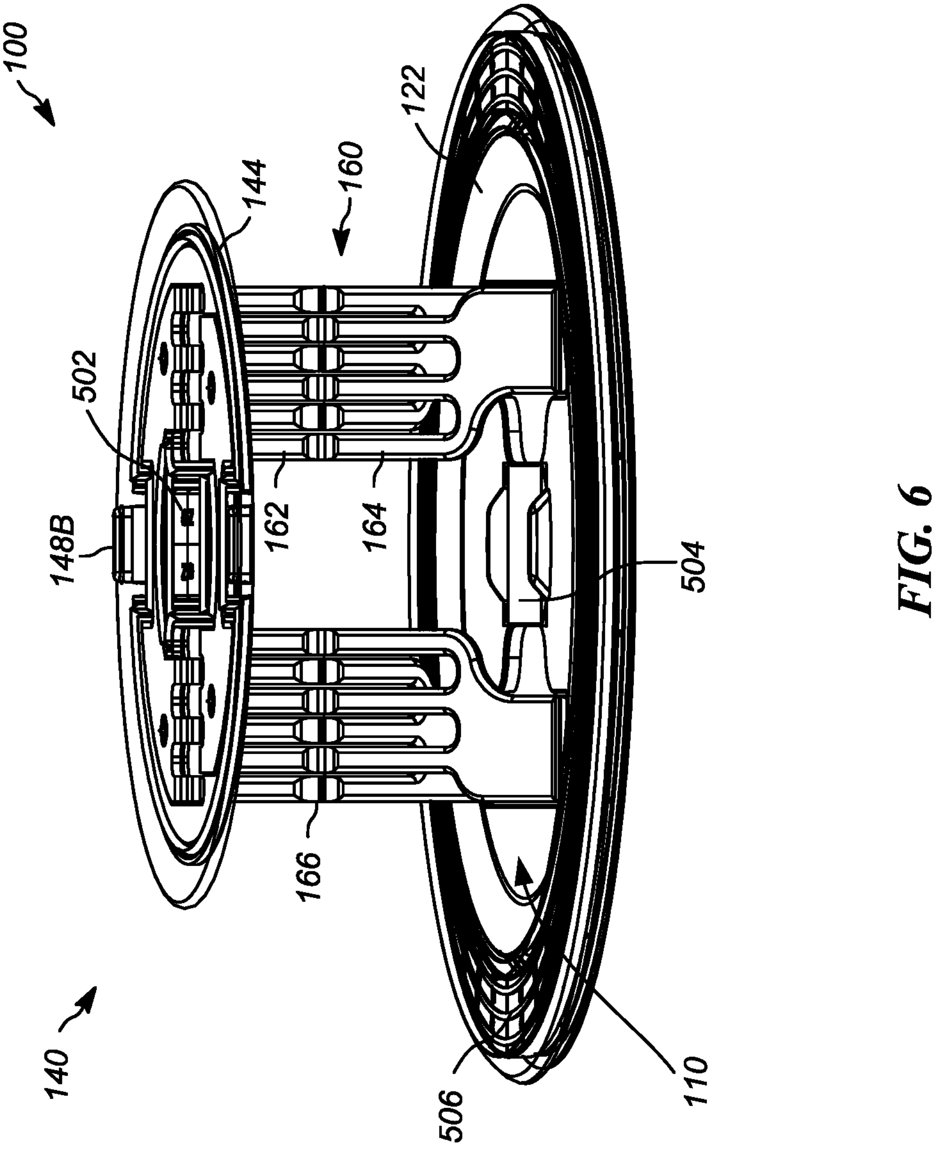
Figure 7:
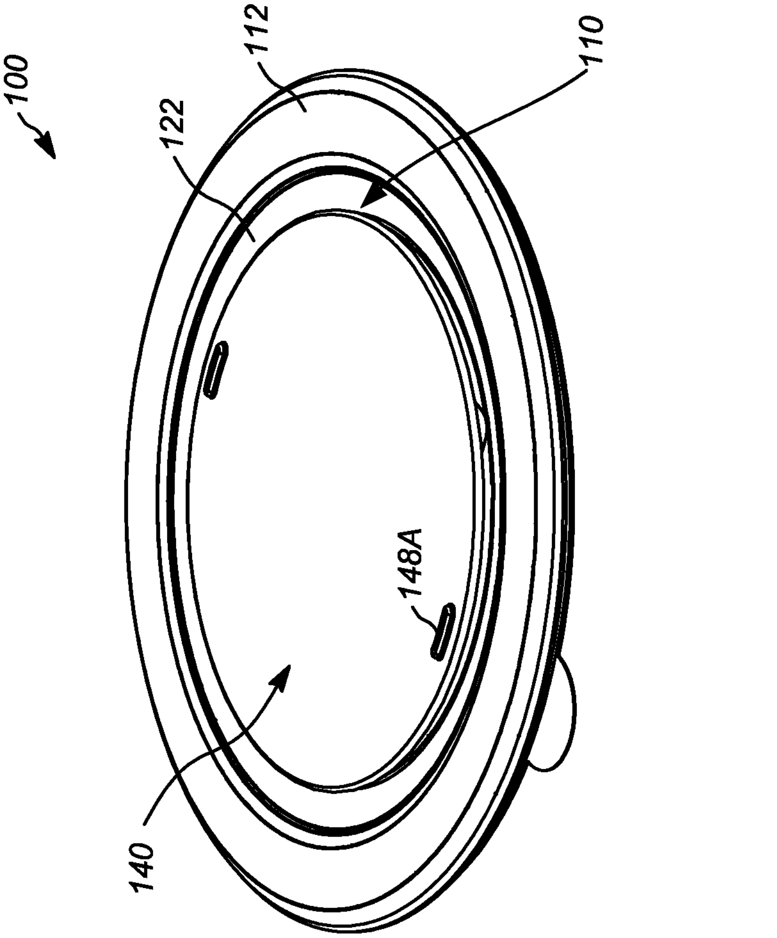
FIGS. 7-10 illustrate the finger grip of FIG. 1 in a captured position.
Figure 8:
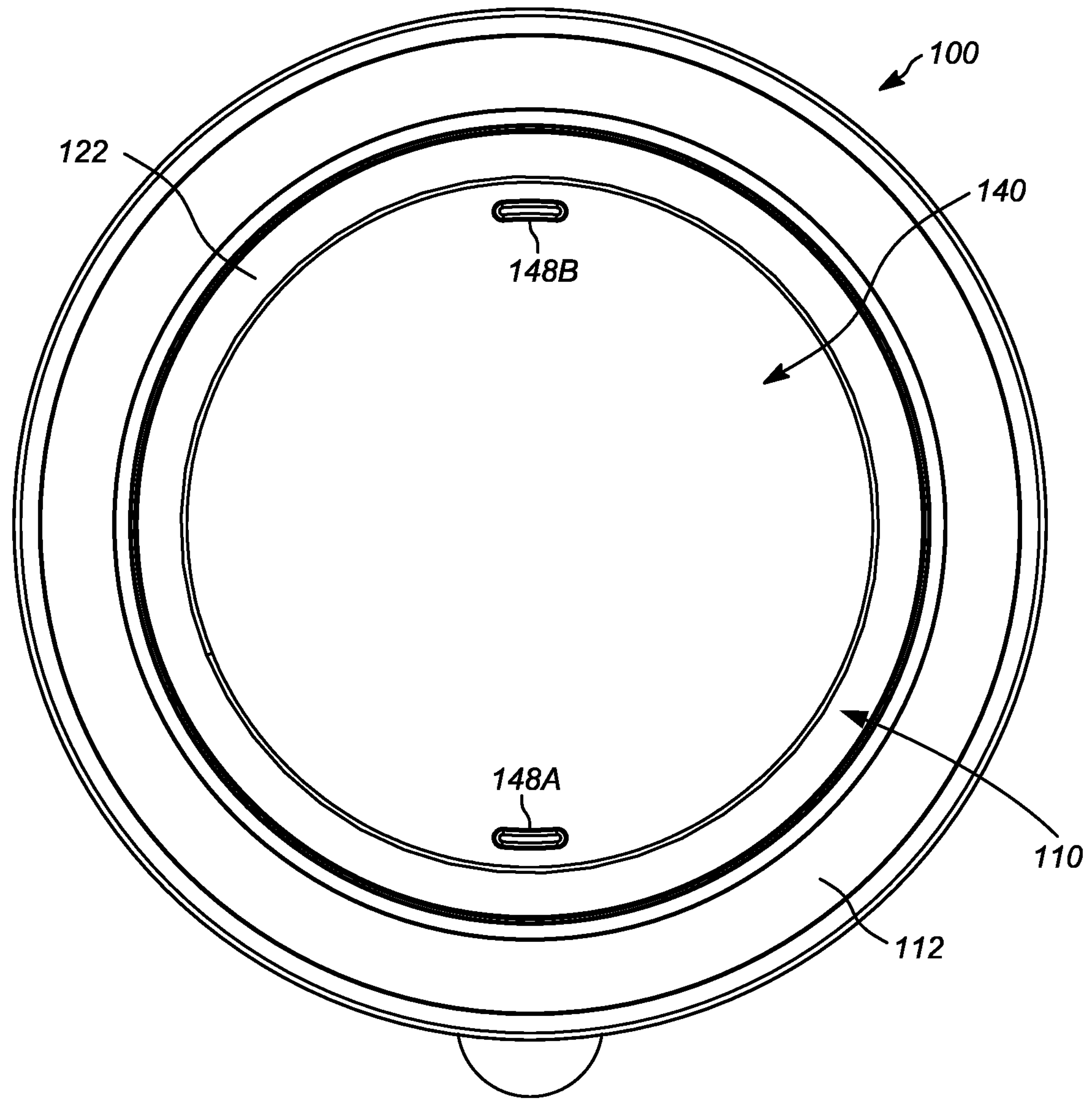
Figure 9:
Figure 10:
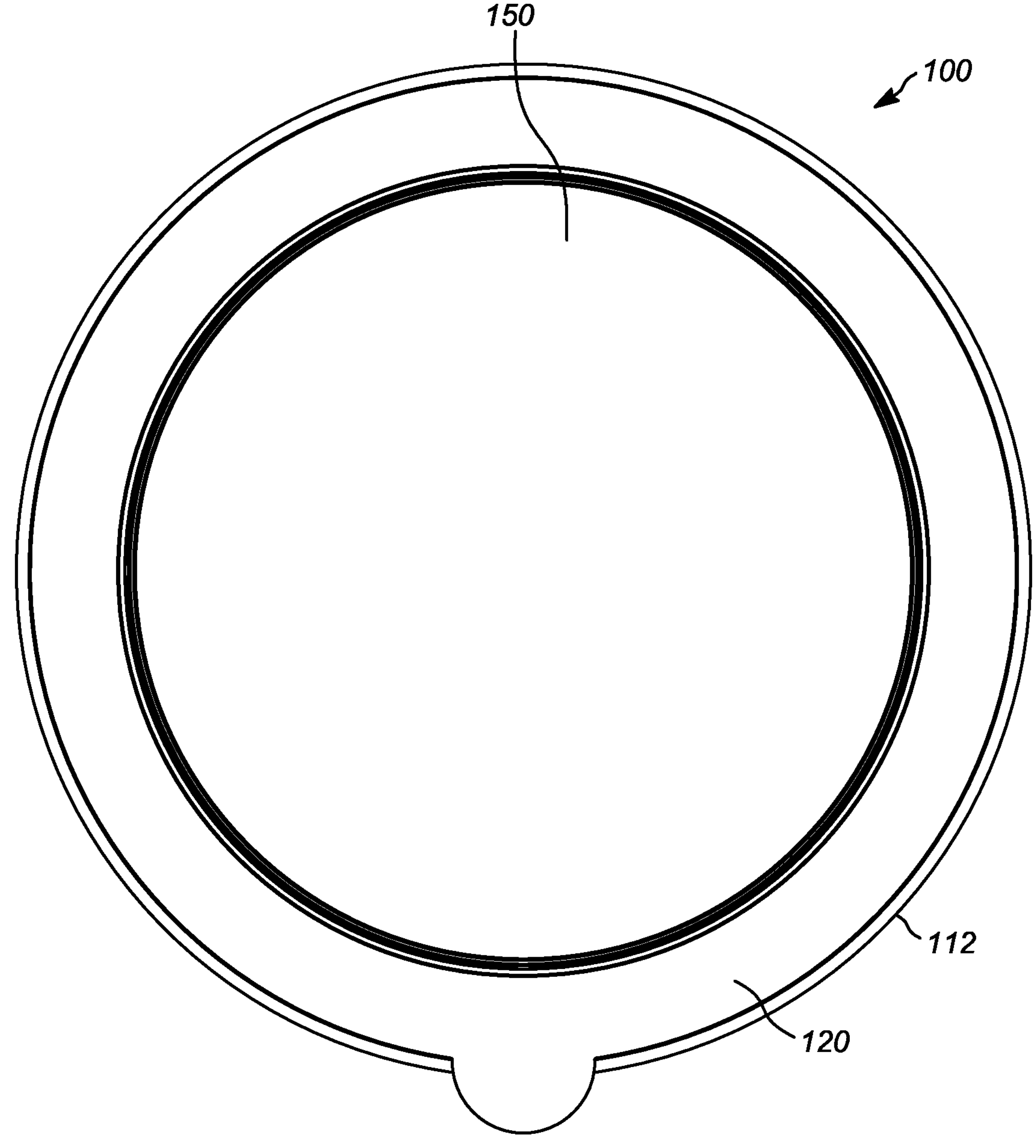

In particular embodiments, the frame 112 may include a circular array of magnets (such as the magnets 506 as indicated in FIGS. 5-6) arranged at least partially around a periphery of the frame 112. For example, the magnets may be configured between the first side 115 and the second side 116 and fully or partially encapsulated by the frame 112. For example, the circular array of magnets may include a plurality of arc-shaped magnet segments connected together. In particular embodiments, the circular array of magnets may be configured to magnetically couple the finger grip 100 to an electronic device such as the smartphone 121. In particular embodiments, the circular array of magnets may be configured to be attached to a wireless charger while allowing wireless charging to pass through the finger grip 100. As an example and not by way of limitation, the size and shape of the circular array of magnets may conform to the MAGSAFE specification. MAGSAFE is a magnetic technology specification from APPLE, built into the internal engineering of certain IPHONE models to create a new ecosystem of accessories for easy attachment and faster wireless charging using magnetic fields. In particular embodiments, alternative or additional to attaching to a wireless charger, the circular array of magnets may allow the finger grip 100 (and consequently the electronic device coupled with the finger grip 100) to be magnetically attached to any suitable metal surfaces such as of phone stands, gym equipment, household appliances so that a user may view the electronic device hands-free. In particular embodiments, the frame 112 may be made of highly conductive metal, such as aluminum, which may also improve the effectiveness of wireless charging through the finger grip 100. In other embodiments, the frame 112 may be made of plastic, plastic with metal, or other suitable materials.

In particular embodiments, the hub 114 may include a retainer plate 122 and a backing plate 150 coupled to the retainer plate 122. Alternatively, in other embodiments, the hub 114 may be formed as a single piece having a first side (e.g., an upper side) and a second side (e.g., a lower side) opposite to the first side. As an example and not by way of limitation, the retainer plate 122 may be rotatably coupled to the frame 112 in a way that allows radial displacement between the hub 114 and the frame 112. The radial displacement may allow the hub 114 to be rotated relative to the likely fixed position of the frame 112. As another example and not by way of limitation, the retainer plate 122 may be removably coupled to the frame 112 such that the hub 114 may be detached from the frame 112. This may provide easy replacement of the hub 114 or the frame 112 to allow a user to change the hub 114 or the frame 112 as desired. In some examples, the retainer plate 122 and the frame 112 may be attached together mechanically. For example, as shown, the retainer plate 122 may include an aperture, a slot, a groove, or the like extending along an outer perimeter of the retainer plate 122, and the frame 112 may include a protrusion, a rib, a tab, or the like extending along an interior perimeter of the frame 112, or vice versa. This way, the retainer plate 122 may be attached to the frame 112 by inserting or snapping the protrusion into the aperture. When assembled, the protrusion may be slidable within the receiving aperture to allow for radial displacement of the retainer plate 122 relative to the frame 112. This may eliminate the need of bearings, reducing the overall size of the finger grip 100. In some examples, the retainer plate 122 and the frame 112 may be attached together magnetically. For example, in particular embodiments, the retainer plate 122 and the frame 112 may include one or more magnets, such as a poly magnet, which may allow rotation of the hub 114 with discrete positions relative to the frame 112. For example, the magnets may be configured with a particular arrangement of polarity so that the hub 114 may cog or snap into place at the discrete positions to align with the proper polarity of the magnets of the frame 112. This way, instead of a smooth rotation, a finite number of alignments for rotation may be provided.

In particular embodiments, the retainer plate 122 may be configured to couple with the flexure bearing 160. The retainer plate 122 may include one or more cavities such as two cavities 124A, 124B for receiving a portion of the flexure bearing 130. As described herein in more detail, the cavities 124A, 124B may provide space into which the flexure bearing 160 may fold, thereby allowing the finger grip 100 to retain a thickness sufficiently thin to maintain inductive coupling between a wireless charging transmitter and receiver, allowing for wireless charging in the presence of the finger grip 100.

In particular embodiments, the retainer plate 122 may include an elongated member 126 that is located between the two cavities 124A, 124B and along a centerline of the retainer plate 122. In particular embodiments, the retainer plate 122 may include one or more base engagement features such as two tabs 132A, 132B, which may be positioned on the elongated member 126. In the illustrated example, the tabs 132A, 132B are spaced from each other along the centerline of the retainer plate 122. The number of base engagement features may vary across embodiments. For example, in some cases, the retainer plate 122 may include more or fewer base engagement features. As described herein in more detail (and shown in FIGS. 11A-11B, for example), the tabs 132A, 132B may protrude upward and engage an edge of the cap assembly 140 to secure the finger grip 100 in the stand position. In other embodiments, although not shown, the base engagement features of the retainer plate 122 or the hub 114 may be one or more slots, grooves, or other suitable components to engage an edge of the cap assembly 140.

In particular embodiments, the backing plate 150 may be coupled to the retainer plate 122, for example, on the bottom side of the retainer plate 122 that faces away from the cap assembly 140. In the illustrated embodiment, the backing plate 150 may be generally circular and flat. Although illustrated as such, this disclosure contemplates any suitable shapes of the backing plate 150. For example, the backing plate 150 may be shaped to completely cover the retainer plate 122. As another example, the backing plate 150 may be shaped to cover a portion of the retainer plate 122. In particular embodiments, the backing plate 150 may be used to reduce friction between the retainer plate 122 and the back of the smartphone 121 or other portable electronic devices to increase the case of rotating the hub 114 around the frame 112.

In particular embodiments, the hub 114 may be thinner than the frame 112 so that a cavity may be formed above the hub 114. The thickness of the hub 114 may vary across embodiments. For example, the thickness may be in a range between about 0.25 mm and about 2 mm, between about 0.5 mm and about 1.5 mm, or between about 0.75 mm and about 1.25 mm. As another example, the thickness may be less than 2 mm, less than 1.5 mm, less than 1.25 mm, less than 1.1 mm, less than 1.05 mm, less than 1 mm, or less than 0.9 mm. As another example, the thickness may be about 0.5, 0.55, 0.60, 0.65, 0.70, 0.75, 0.80, 0.85, 0.90, 0.95, 1, 1.05, 1.1, 1.15, 1.2, 1.25, 1.3, 1.35, 1.4, 1.45, or 1.5 mm (+/−about 0.0025 mm). In some embodiments, the base 110 may be made of plastic (e.g., ABS plastic, polycarbonate/acrylonitrile butadiene styrene (PC-ABS)) or any non-ferrous metal (e.g., aluminum, copper, magnesium alloy).

In particular embodiments, the cap assembly 140 may include a first plate 143 and a second plate 144 coupled to the first plate 143. Although illustrated as circular, the shape of the cap assembly 140 may vary across embodiments. For example, the cap assembly 140 may be relatively rectangular, elliptical, triangular, polygonal, non-polygonal, or irregular in shape. As another example, the cap assembly 140 may have a shape of a leaf, a flower, or a particular object. In some cases, the cap assembly 140 may be symmetrical or non-symmetrical in shape. In some cases, the shape of the cap assembly 140 may be complementary to the interior edge shape of the base 110 (e.g., a shape defined by an interior edge of the frame 112). In this way, in the captured position, when the cap assembly 140 is pressed down into the base 110, the cap assembly 140 may fit within the cavity located above the hub 114 and at or below the top surface of the frame 112 such that a top surface of the cap assembly 140 is substantially flush with a top surface of the frame 112.

In particular embodiments, the first plate 143 may be a generally planar structure and may be distal from the base 110. Although illustrated as generally planar, the first plate 143 may be non-planar. For example, in some cases, the first plate 143 may be textured, curved (e.g., concave, convex), or configured with surface structures, etc.

In particular embodiments, the second plate 144 may be coupled to the first plate 143 and proximate the base 110. In the example as shown, the second plate 144 may include one or more cap engagement features, such as two openings 142A, 142B, which may be configured for accommodating the base engagement features, such as the tabs 132A, 132B, of the base 110. Positions of the openings 142A, 142B may correspond to the positions of the tabs 132A, 132B (e.g., spaced apart from each other along a centerline). For example, in the captured position in which the cap assembly 140 is received by the base 110, the tabs 132A, 132B may protrude into the openings 142A, 142B and be contained within the cap assembly 140 (e.g., in a space between the first plate 143 and the second plate 144). This may also help reduce the overall thickness of the finger grip 100. Although shown as having two pairs of engagement features, this disclosure contemplates any suitable number of engagement features. Moreover, the engagement features may be implemented differently across embodiments. For example, the cap assembly 140 and base 110 may include any coinciding engagement features (e.g., a snap-fit pairing, a hinge and coinciding lip, an interference fit pairing, a hook and loop fastener, a protrusion and slot, a clip, a clamp, a clasp, a buckle, a button, a hook and protrusion, a screw and aperture, a wire, etc.) for performing the desired function of this disclosure.

In particular embodiments, the cap assembly 140 may include one or more location-indicating nubs, such as two location-indicating nubs 148A, 148B, for communicating to the user where on the cap assembly 140 to press and/or to slide the cap assembly 140 to open. In particular embodiments, the location-indicating nubs 148A, 148B may protrude beyond the first plate 143 in a way that resembles home keys on a keyboard or other suitable haptics. The location-indicating nubs 148A, 148B may be positioned at a distance from each other along the centerline of the first plate 143 at a particular orientation. As an example and not by way of limitation, because the flexure bearing 160 may fold about a certain axis, the push-to-open may work better when the user presses on the perpendicular axis to the hinge fold axis, which may be indicated by the location-indicating nubs 148A, 148B. While the finger grip 100 may still be pushed to open about various positions along the perimeter of the cap assembly 140, depending on conditions, it may be desirable to push at north and/or south as indicated by the location-indicating nubs 148A, 148B.

In particular embodiments, the location-indicating nubs 148A, 148B may be configured to be able to deflect out of the way (e.g., inward relative to the first plate 143) when used with a wireless charger. As an example and not by way of limitation, the location-indicating nubs 148A, 148B may each include a spring mechanism such as a spring tab or other suitable deflectable member to allow the location-indicating nubs 148A, 148B to protrude far enough to provide tactile feedback to the user and not increase the overall nominal thickness of the cap assembly 140 or the finger grip 100 in general. For example, the spring mechanisms may be formed at the second plate 144 and deflect upward through corresponding openings provided at the first plate 143. This can be more clearly observed in FIGS. 5-6. It will be understood that the location-indicating nubs 148A, 148B may be implemented differently across embodiments. Although this disclosure describes a finger grip with a location-indicating nub in a particular manner, this disclosure contemplates finger grips with any suitable location-indicating nubs in any suitable manner.

Figures 18, 19:
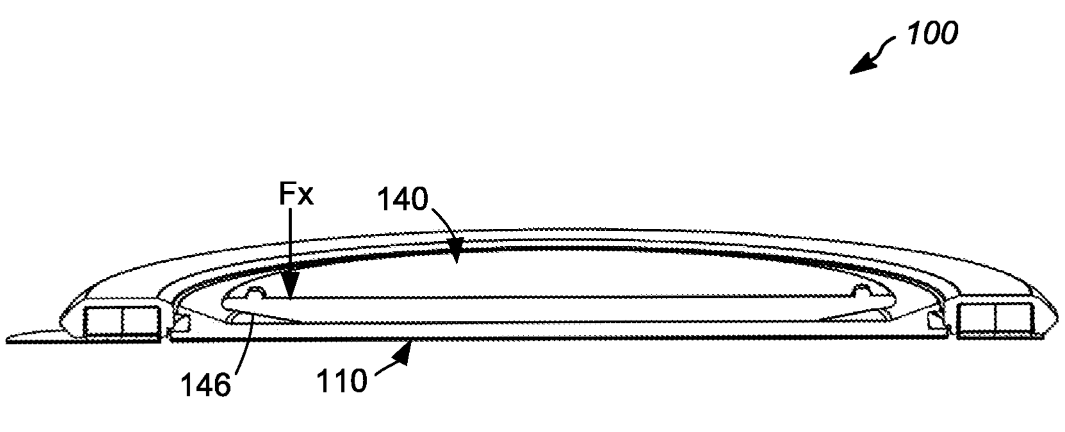
FIGS. 18-19 illustrate partial cross-sectional views of the finger grip in the captured position.

In particular embodiments, the cap assembly 140 may include a sloped portion 146 at a lower surface of the cap assembly 140 that faces the base 110. As an example and not by way of limitation (as illustrated in FIGS. 18-19), the sloped portion 146 may be formed by the first plate 143 and/or the second plate 144. The sloped portion 146 may facilitate the disengagement of the cap assembly 140 from the base 110. For example, the sloped portion 146 may serve as a fulcrum and help initiate a lever action when the user presses down on the edge of the cap assembly 140 such that the cap assembly 140 may be angled about the sloped portion 146. This may help separate the cap assembly 140 from the base 110. The sloped portion 146 may be implemented in a variety of ways. For example, the sloped portion 146 may include a sloped surface, a curved surface, a tapered surface, a chamfered surface, a filleted surface, or the like. Additionally or alternatively, in particular embodiments, the base 110 may include a sloped portion at an upper surface of the base 110 that faces the cap assembly 140. For example, the sloped portion may be provided at an upper surface of the hub 114. The sloped portion of the base 110 may be configured to provide similar functions as the sloped portion 146 of the cap assembly 140, e.g., to facilitate the disengagement of the cap assembly 140 from the base 110.

The thickness of the cap assembly 140 may vary across embodiments. For example, the thickness may be in a range between about 0.25 mm and about 2 mm, between about 0.5 mm and about 1.5 mm, or between about 0.75 mm and about 1.25 mm. As another example, the thickness may be less than 2 mm, less than 1.5 mm, less than 1.2 mm, less than 1.1 mm, less than 1.05 mm, less than 1 mm, or less than 0.9 mm. As another example, the thickness may be about 0.5, 0.55, 0.60, 0.65, 0.70, 0.75, 0.80, 0.85, 0.90, 0.95, 1, 1.05, 1.1, 1.15, 1.2, 1.25, 1.3, 1.35, 1.4, 1.45, or 1.5 mm (+/−about 0.0025 mm).

In particular embodiments, the cap assembly 140 may be made extremely rigid. For example, because of the relatively short throw of a lever created by the cap assembly 140 (e.g., roughly about 1 to 2 mm at most), any flex in the cap assembly 140 while pressing on its edge may severely limit how high the cap assembly 140 would raise when pressed, for example, in order to escape a magnetic force (which is used to hold the cap assembly 140 to the base 110 in the captured state) and fully disengage from the base 110 and stay open. As an example and not by way of limitation, considering the extreme thinness of various components and the overall finger grip 100, the rigidity may be achieved by using a specialized exotic material such as a 40-60% glass-filled nylon or polyarylamide material. Additionally or alternatively, the two-ply assembly of the first plate 143 and the second plate 144 may also provide the desired rigidity. For example, the first plate 143 and the second plate 144 may be joined by ultrasonic welding, capturing at least a portion of the flexure bearing 160 therebetween within the cap assembly 140. This may add significant rigidity to the overall structure of the cap assembly 140.

In particular embodiments, the flexure bearing 160 may be coupled to the base 110 and the cap assembly 140. As a non-limiting example, the flexure bearing 160 may be a compliant mechanism that provides at least one degree of freedom to allow the cap assembly 140 to move relative to the base 110. In some cases, the at least one degree of freedom includes only one degree of freedom. In some cases, the at least one degree of freedom includes more than one degree of freedom, such as two, three, four, or more degrees of freedom. In particular embodiments, the flexure bearing 160 may allow the finger grip 100 to move between various positions including but not limited to: a captured position (e.g., where the cap assembly 140 contacts the base 110), a non-captured position (e.g., where the cap assembly 140 is separated from the base 110), and/or a stand position (e.g., where an edge of the cap assembly 140 is fitted to or caught by the base engagement feature of the base 110). For example, when the finger grip 100 is in the captured position and then the cap assembly 140 is released from the base 110, the flexure bearing 160 may impart a force that is translated to the cap assembly 140 to push the finger grip 100 into the non-captured position. It will be understood that a "non-captured position" is a generalized term that refers to any position in which the cap assembly 140 is separated from the base 110. For example, in the non-captured position of the finger grip 100, the flexure bearing 160 may allow a two-finger mode (e.g., where a user may insert two fingers between the cap assembly 140 and the base 110 with the flexure bearing 160 positioned in between the two fingers) and a one-finger mode (e.g., where one finger may penetrate a lower opening 302 formed by the flexure bearing 160, details of which will be further explained below). As such, there may be a plurality of non-captured positions, differing by the size of a gap between the cap assembly 140 and the base 110, as well as the orientation of the cap assembly 140 relative to the base 110. Similarly, for example, a "stand position" may refer to any position in which the cap assembly 140 is fixed at an angle relative to the base 110.

In particular embodiments, each flexure bearing 160 may include an upper arm section 162 coupled to the cap assembly 140, a lower arm section 164 coupled to the base 110, and a middle hinge 166 coupling the upper arm section 162 to the lower arm section 164. As an example and not by way of limitation, the lower arm section 164 may be longer than the upper arm section 162. In this way, when the finger grip is deployed in the one-finger mode, a relatively large lower opening 302 may be formed between the lower arm sections 164 such that the user may easily insert a single finger through the lower opening 302. Furthermore, the flexure bearing 160 may include a lower hinge coupling the lower arm section 164 to the base 110 and an upper hinge coupling the upper arm section 162 to the cap assembly 140. Although the finger grip 100 is illustrated as including a flexure bearing 160 in a particular manner, it will be appreciated that the flexure bearing 160 may vary across embodiments. For example, the flexure bearing 160 may include fewer or additional segments. Furthermore, the finger grip 100 may include any other flexure bearing in place of the flexure bearing 160.

FIGS. 5-6 illustrate some example internal structures of the finger grip 100 of FIG. 1 in the non-captured position, with particular external structures (e.g., the first plate 143 of the cap assembly 140 and the first side 115 of the frame 112) removed for illustration purposes.

In particular embodiments, the cap assembly 140 may include a first magnetic component 502 for facilitating the push-to-open and/or the push-to-close functionalities. As an example and not by way of limitation, the first magnetic component 502 may be coupled to the second plate 144 of the cap assembly 140 or held between the first plate 143 and the second plate 144. Correspondingly, the base 110 may include a second magnetic component 504 for interacting with the first magnetic component 504. As an example and not by way of limitation, the second magnetic component 504 may be coupled to the retainer plate 122 or held between the retainer plate 122 and the backing plate 150 at a position corresponding to the position of the first magnetic component 502. For example, the first and second magnetic components 502, 504 may be positioned near the center of the cap assembly 140 and the base 110, respectively. As another example, the first and second magnetic components 502, 504 may be positioned around the perimeter or at other positions of the cap assembly 140 and the base 110 (or the hub 114 of the base 110 in particular), respectively. In particular embodiments, the first and second magnetic components 502, 504 may be uncoated. In other embodiments, the first and second magnetic components 502, 504 may be coated in non-conductive material such as resin, polymer, ceramic, or other suitable material.

In particular embodiments, the first and second magnetic components 502, 504 may each include an array of poles or multiple poles (e.g., multiple south and north poles). Each of the poles may have a different polarity from an adjacent pole. In the illustrated example, the first and second magnetic components 502, 504 each includes four poles. In other examples, the first and second magnetic components 502, 504 may each include six, eight, ten, or any suitable number of poles. In some examples, the first and second magnetic components 502, 504 may be thin magnets configured with high strength/size ratio. For example, the magnets may be grade N52, N54H, or N54M, which is the highest possible grade and strength/size ratio available. This way, it may be ensured that the magnet does not demagnetize at high temperatures, which may be encountered during wireless charging. Although certain grades of magnets are disclosed, any suitable grade of magnet may be utilized, such as N48 as an example but not by way of limitation. In some examples, the first and second magnetic components 502, 504 may be neodymium magnets, ferrite magnets, samarium cobalt magnets, or other suitable magnets. In some examples, the first and second magnetic components 502, 504 may be configured with the shortest possible throw such that the first and second magnetic components 502, 504 may engage or attract at the shortest possible distance, thereby facilitating the push-to-open and/or push-to-close functionalities. In particular embodiments, the magnetic components may or may not be separated or making contact with each other. For example, the distance between the first and second magnetic components 502, 504 when in the captured position may be set as small as possible, e.g., roughly about 0.5 mm or less. Configured as such, the cap assembly 140 may be able to pop open as needed. This may also eliminate the need for mechanical retainers, snap-fit pairings, or the like for holding the cap assembly 140 and the base 110 together in the captured position.

In particular embodiments, the first and second magnetic components 502, 504 may each include a plurality of magnet segments. The plurality of magnet segments may be arranged in a particular grid shape. As an example and not by way of limitation, the first and second magnetic components 502, 504 may each include an 8-segment array in a 2 by 4 grid. For example, instead of using one magnet on the cap assembly 140 and one magnet on the base 110, eight segments may be provided on the cap assembly 140, and eight segments may be provided on the base 110. In other examples, the magnetic component may have varying numbers of segments, such as 10, 100, 500, or more. This may prevent a transmitting coil of a wireless charger used during wireless charging from detecting a foreign object, e.g., within the cap assembly 140 or the base 110. By decreasing the size of the magnets, the amount of eddy currents generated from within the magnet may be reduced, thus preventing the transmitting coil from detecting a foreign object while charging. In particular embodiments, each of the segments may be configured end-to-end with an adjacent segment. In particular embodiments, two of the magnets in the opposing corners may be flipped to oppose their counterparts. This may provide magnet-assisted opening to better aid the push-to-open functionality. For example, when the finger grip 100 is closed or maintained in the captured position for a prolonged time, the finger grip 100 may "reset" to the non-captured position. The added assist may help make the push-to-open more successful. It should be understood that this disclosure contemplates various combinations of magnet arrays and pole orientations for achieving the desired function according to this disclosure.

In particular embodiments, the first and second magnetic components 502, 504 may each include a poly magnet. For example, the poly magnets may be configured to attract at a first threshold distance to magnetically couple the cap assembly 140 and the base 110 together, and to repel at a second threshold distance to push the cap assembly 140 away from the base 110. In certain embodiments, a pair of spring poly magnets may be provided, which may reset at a particular distance away from each other and attract when pulled farther away and repel when pushed closer. Alternatively or additionally, in certain embodiments, a pair of latch poly magnets may be provided, which may repel each other until they are pushed to a particular distance toward each other. When they reach this particular distance, they will attract and close. Although this disclosure describes a finger grip with a magnetic component in a particular manner, this disclosure contemplates finger grips with any suitable magnetic component in any suitable manner.

FIGS. 7-10 illustrate a front perspective view, a top view, a side view, and a bottom view, respectively, of the finger grip 100 of FIG. 1 in a captured position. In the captured position, the cap assembly 140 may contact the base 110 and the finger grip 100 is compact such that a thickness T1 of the finger grip 100 is sufficiently thin to maintain inductive coupling between a wireless charging transmitter and receiver, allowing for wireless charging in the presence of the finger grip 100.

The thickness T1 of the finger grip 100 may vary across embodiments. In particular embodiments, when the finger grip 100 is in the captured position, the thickness T1 of the finger grip 100 may be 2.5 mm at maximum. However, other values are also possible and contemplated by the disclosure. For example, when the finger grip 100 is in the captured position, the thickness T1 of the finger grip 100 may be in a range between about 1 mm and about 4.5 mm, between about 1 mm and about 3.5 mm, or between about 1.25 mm and about 1.75 mm. As another example, when the finger grip 100 is in the captured position, the thickness T1 of the finger grip 100 may be less than 4.5 mm, less than 4 mm, less than 3.5 mm, less than 3 mm, less than 2.5 mm, less than 2 mm, less than 1.5 mm, less than 1 mm, or less than 0.5 mm. As another example, when the finger grip 100 is in the captured position, the thickness T1 of the finger grip 100 may be about 0.5, 0.75, 1, 1.25, 1.5, 1.75, 2, 2.25, 2.5, 2.75, 3, 3.25, 3.5, 3.75, 4, 4.25, 4.5, 4.75, or 5 mm (+/−about 0.05 mm).

In some cases, the thickness T1 of the finger grip 100 while in the captured position is sufficiently thin to maintain inductive coupling between a wireless charging transmitter and receiver, allowing for wireless charging in the presence of the finger grip 100, such that a charging device coupled to the first side 115 of the base 110 may provide a charge to a second device (e.g., a smartphone) coupled to the second side 116 on the base 110. For example, the thickness T1 of the finger grip 100 while in the captured position may be sufficiently thin so as to permit wireless charging using QI or other wireless power transfer standards (e.g., using a MAGSAFE charger).

Figure 11A:
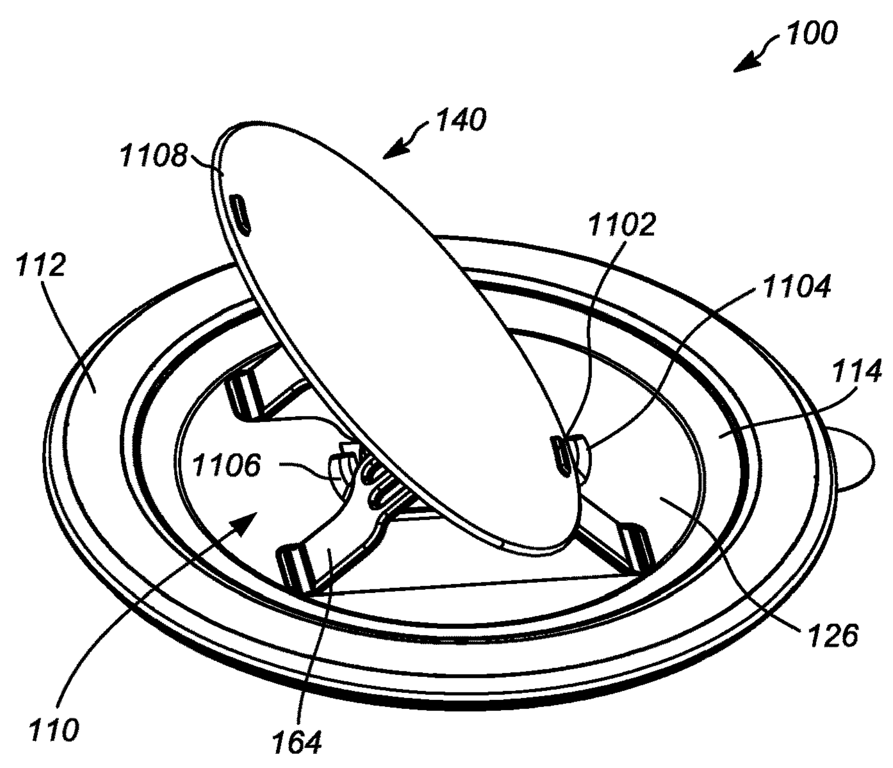
FIGS. 11A-11B illustrate the finger grip of FIG. 1 in a stand position.
Figure 11B:
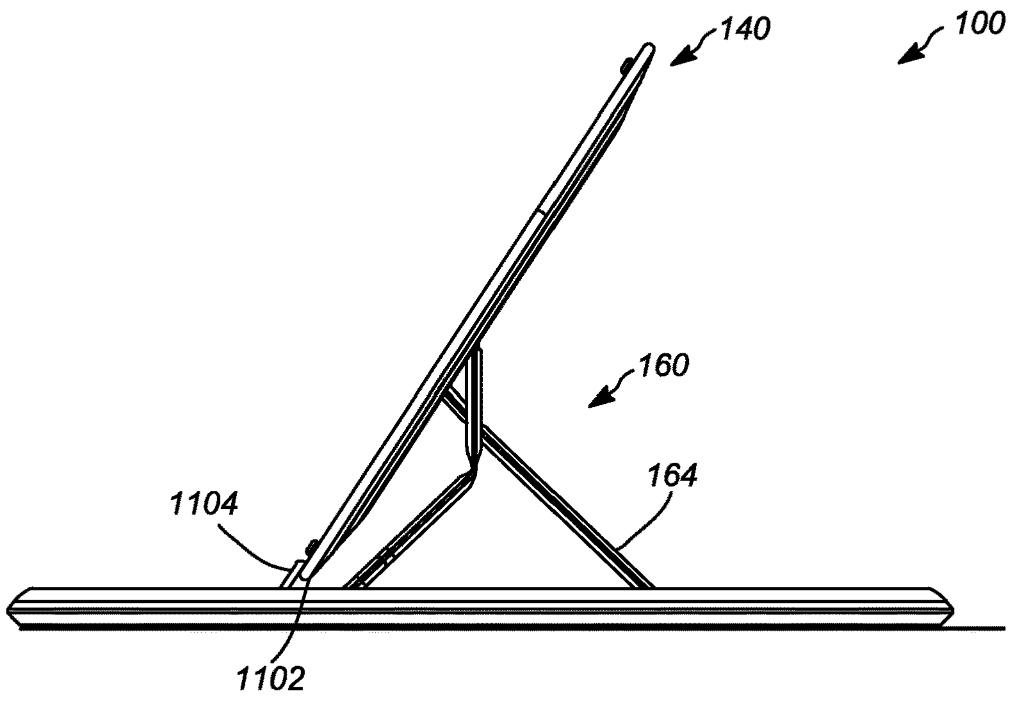

FIGS. 11A-11B illustrate the finger grip 100 of FIG. 1 in a stand position. In the stand position, an edge 1102 of the cap assembly 140 may be fitted behind or caught by the engagement feature 1104 of the retainer plate 122 of the base 110. It will be appreciated that the engagement feature 1104 is provided merely as an example and other examples may use fewer, additional, or different components or arrangements. For example, the engagement feature 1104 may be an embodiment of the base engagement feature such as the tabs 132A, 132B. In the stand position, the cap assembly 140 may function as a tool (sometimes referred to as a kickstand) for propping the portable device up on a surface so a user can view the screen hands-free.

In particular embodiments, the engagement feature 1104 may be formed as a tab, a ridge, a notch, or the like, which may be structured on an upper surface of the elongated member 126. As an example and not by way of limitation, the engagement feature 1104 may be inclined relative to the upper surface of the elongated member 126, e.g., at an angle less than 90 degrees, so as to easily catch the edge 1102 of the cap assembly 140. In particular embodiments, in the stand position, the engagement feature 1104 may fix the cap assembly 140 relative to the base 110 in a locked manner such that the finger grip 100 is able to maintain its stand position without collapsing regardless of any pressure applied to the cap assembly 140 (e.g., whether on the front or the back). Although this disclosure describes an engagement feature in a particular manner, this disclosure contemplates engagement features in any suitable manner.

In particular embodiments, the finger grip 100 may include multiple stand configurations. For example, in some cases, the finger grip 100 may be symmetrical such that a first stand position may be formed by placing a first edge 1102 of the cap assembly 140 behind a first engagement feature 1104, and a second stand position may be formed by placing a second edge 1108 of the cap assembly 140 behind a second engagement feature 1106. In some cases, the angle of the stand (e.g., the angle between a plane of the cap assembly 140 and a plane of the base 110) may be the same for the first stand position and the second stand position. Alternatively, in some cases, the angle of the stand for the first stand position may be different from the angle of the stand for the second stand position. For example, the angle for a particular stand position may be in a range between about 70 degrees and about 130 degrees, between about 90 degrees and about 120 degrees, or between about 100 degrees and about 110 degrees. As another example, the angle for a particular stand position may be about 70, 75, 80, 85, 90, 95, 100, 105, 110, 115, 120, 125, 130, 135, 140, 145, or 150 degrees (+/−about 1 degree). In some cases, the finger grip 100 may allow for multiple stand angles. For example, in some cases, the elongated member 126 may include a plurality of engagement features (e.g., in the forms of tabs, ridges, or notches) along its length, which the user can select between to selectively angle the cap assembly 140 relative to the base 110.

In particular embodiments, a user may shift the finger grip 100 of FIG. 1 from a captured position to a stand position following an example transitional sequence. For example, starting in the captured state of FIG. 7, when the user slides, pries, presses, or otherwise operates on one side of the cap assembly 140, the cap assembly 140 may disengage from the base 110 and (as a result of elastic body deformation of the flexure bearing 160 and/or interaction between the first and second magnetic components 502, 504) reflexively separate from the base 110, as shown in FIG. 2. When the user rotates the cap assembly 140 about 90 degrees and places the pivot edge 1102 of the cap assembly 140 behind a first engagement feature 1104, the finger grip 100 may reside in a stand position, as shown in FIG. 11A.

Once the cap assembly 140 is moved into place behind the desired engagement feature 1104, at least a portion of the flexure bearing 160 may keep the cap assembly 140 behind the desired engagement feature 1104 in tension. For example, this can be more clearly observed in FIG. 11B, where a pair of the lower arm sections 164 acts as a brace supporting the cap assembly 140. While in the stand position, the hub 114 is rotatable within the frame 112 to allow the user to rotate the stand, for example, to select between a portrait or landscape orientation.

To disengage the stand position (sometimes referred to as a kickstand configuration) shown in FIGS. 11A-11B, the user simply lifts the pivot edge 1102 of the cap assembly 140 over the engagement feature 1104 and the flexure bearing 160 will reflexively reorient the cap assembly 140 so that the finger grip 100 is in a non-captured position. Alternatively, to disengage the stand position, the user can press on the raised edge (e.g., edge 1108) of the cap assembly 140 until the cap assembly 140 is forced out of the engagement feature 1104.

Figure 12A:
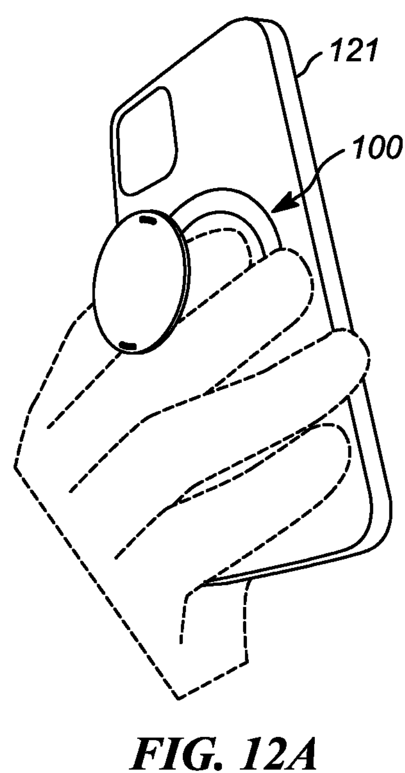
FIGS. 12A-14B illustrate example use of the finger grip for holding a smartphone.
Figure 12B:
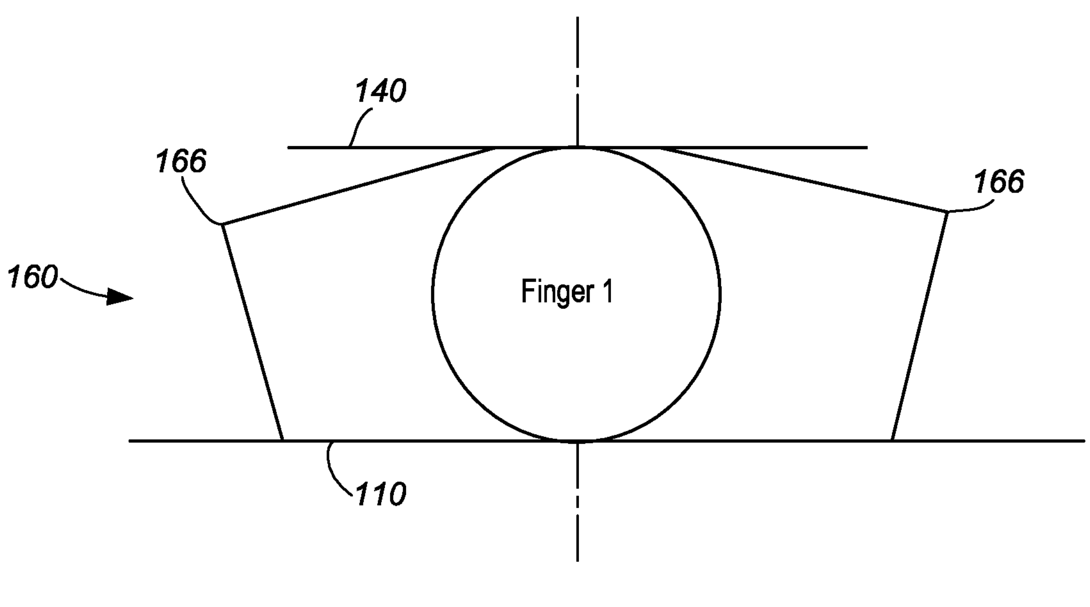
Figure 13:
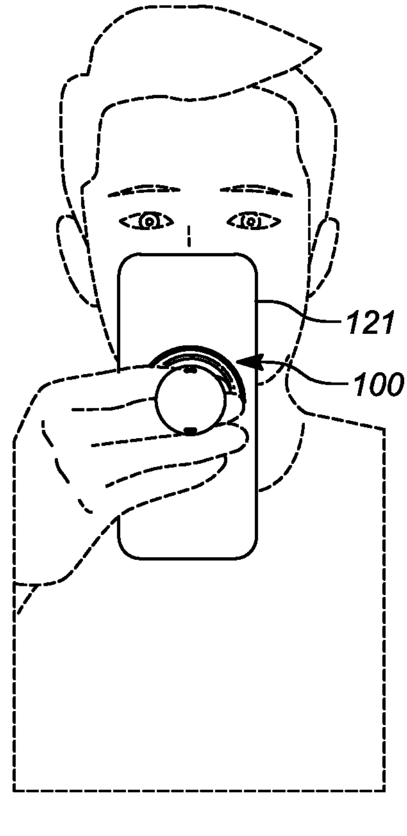
Figure 14A:
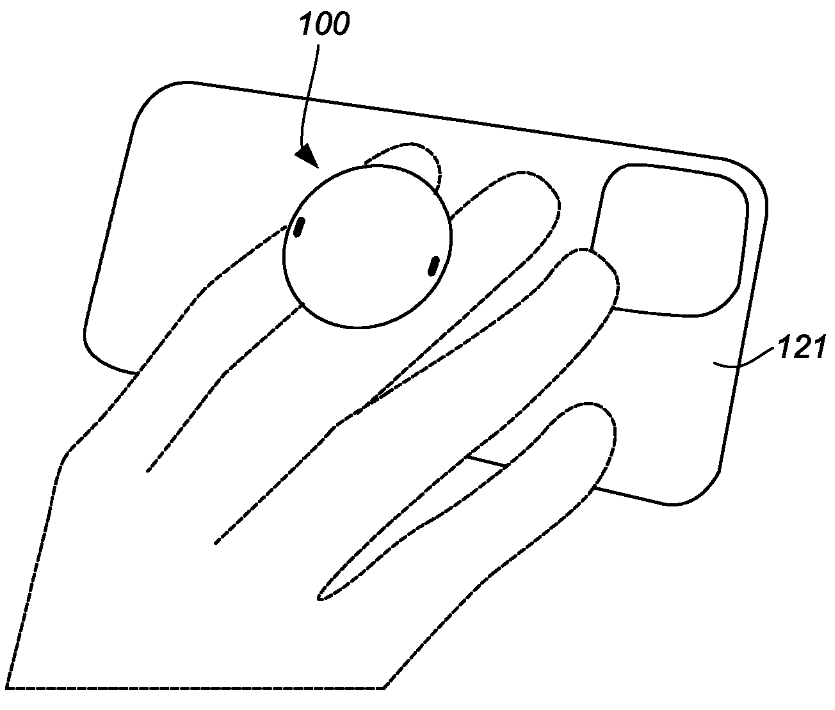
Figure 14B:
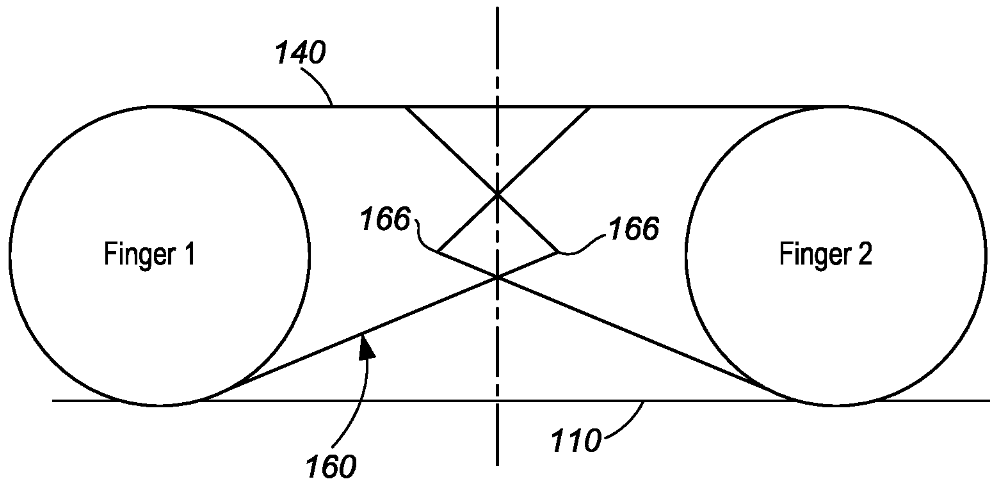

FIGS. 12A-14B illustrate example use of the finger grip 100 for holding a smartphone 121. In particular, FIGS. 12A-12B illustrate the one-finger mode where a single finger may be inserted through the lower opening 302 (depicted in FIG. 3) defined by the flexure bearing 160. In the one-finger mode, as the user inserts the finger between the two flexure bearings 160, the middle hinges 166 may bend outward away from each other, e.g., due to the material property of the flexure bearings 160. This may create a large space for accommodating the finger, increasing user comfort. FIGS. 13, 14A, and 14B illustrate the two-finger mode where a pair of fingers may be placed along the sides of the flexure bearings 160. In the two-finger mode, the middle hinges 166 may bend inward toward each other. Although only the single-finger mode and the two-finger mode are illustrated, it will be appreciated that the finger grip 100 can be held using various manners, such as any manner that feels comfortable to or functional for a user.

Figure 15:
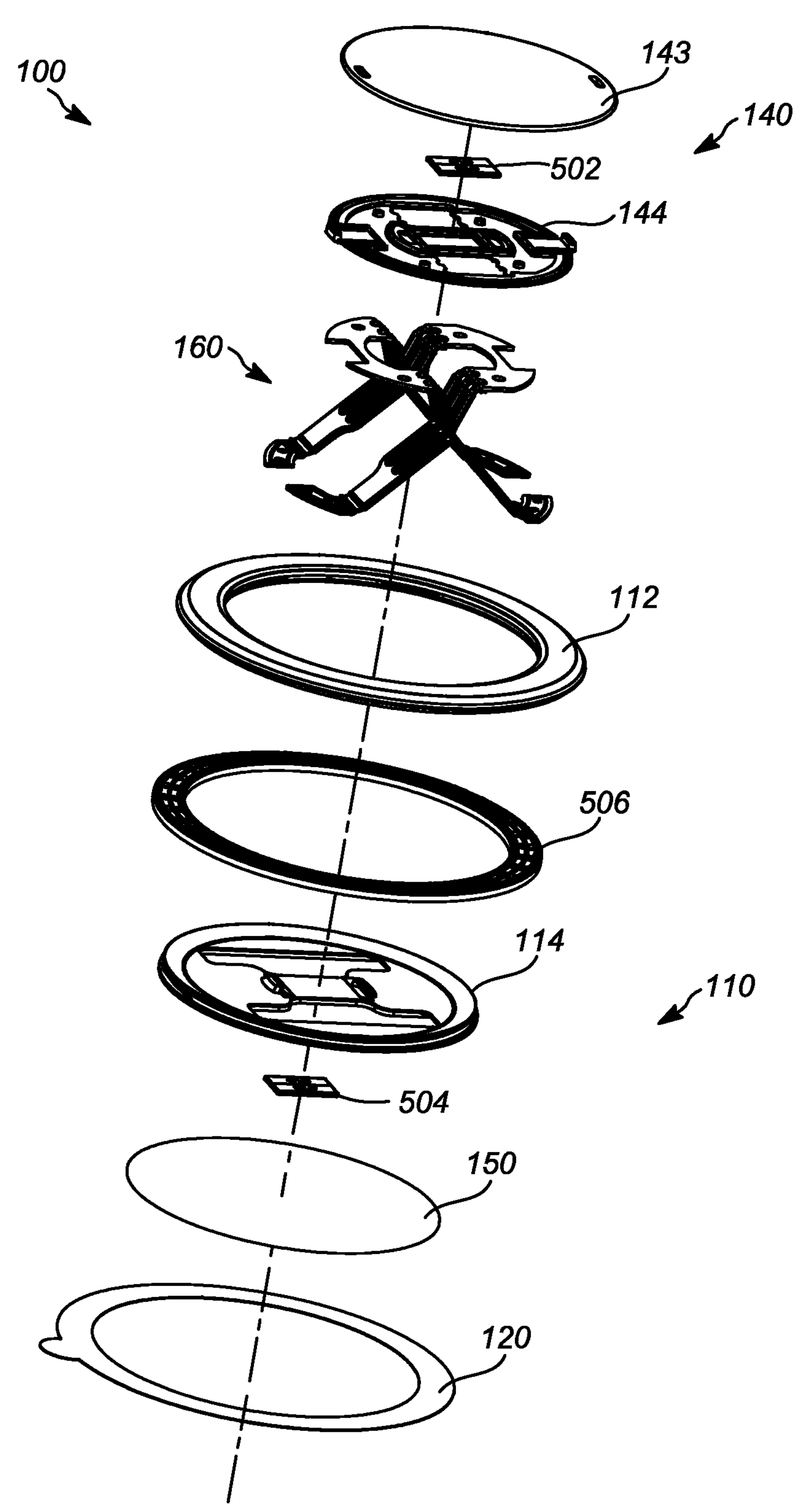
FIG. 15 illustrates an exploded view of the finger grip of FIG. 1.

FIG. 15 illustrates an exploded view of the finger grip 100. It will be appreciated that the finger grip 100 represents an example finger grip and other examples may use fewer, additional, or different components or arrangements. In particular embodiments, the finger grip 100 may include the cap assembly 140, at least two flexure bearings 160, and the base 110. In particular embodiments, the cap assembly 140 may include the first plate 143, the second plate 144, and the first magnetic component 502 sandwiched between the first plate 143 and the second plate 144. In particular embodiments, the flexure bearing 160 may be coupled to the cap assembly 140 and the base 110 in a way to allow the finger grip 100 to operate in various positions and configurations (such as the non-captured position, the captured position, the kickstand position, the one-finger mode, etc.) In particular embodiments, the base 110 may include the hub 114, the second magnetic component 504, the magnets 506, the backing plate 150.

Figure 16:
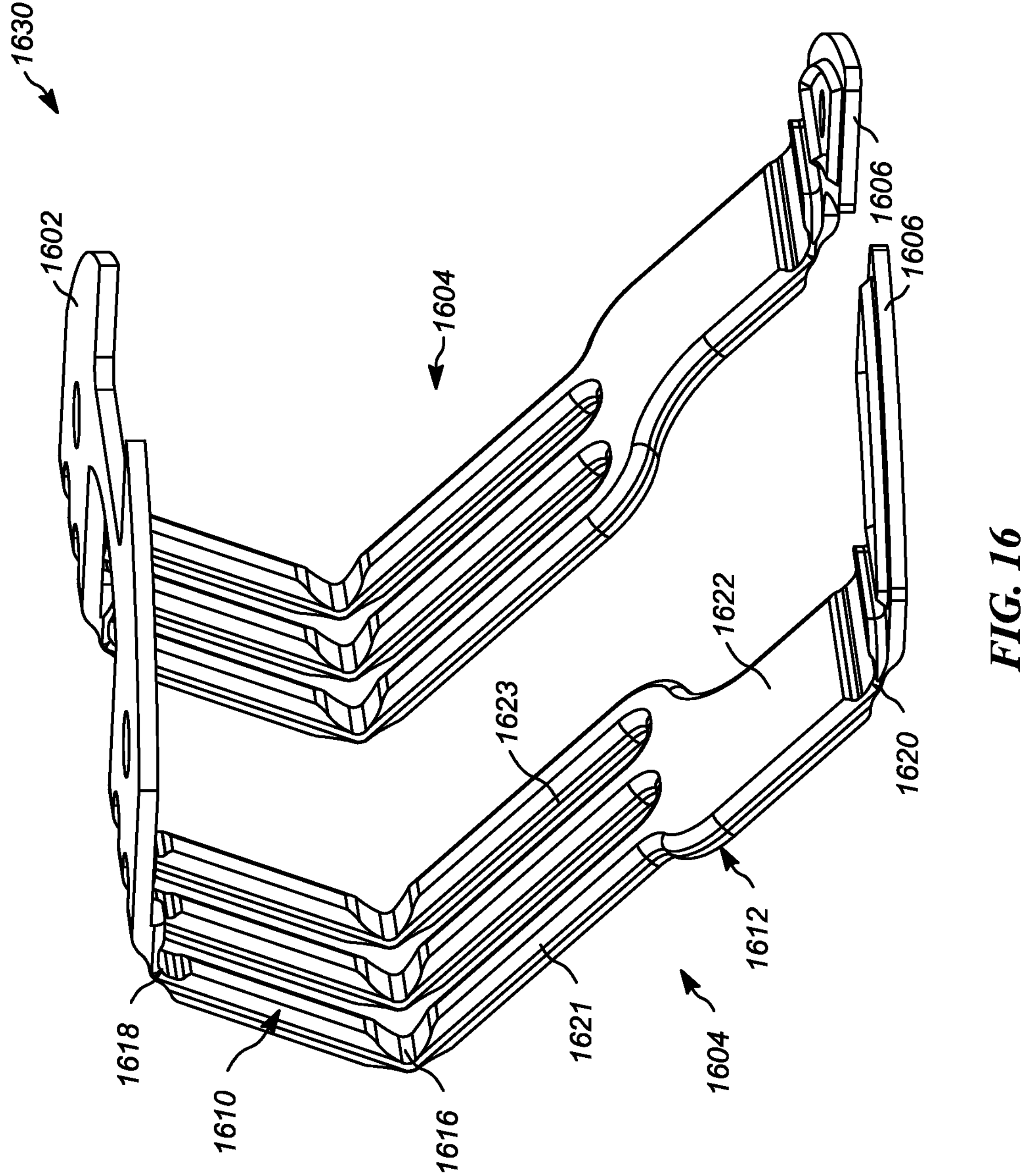
FIG. 16 illustrates an example flexure bearing.

FIG. 16 illustrates an example flexure bearing 1630. The flexure bearing 1630 may be an embodiment of a flexure bearing 160 of FIG. 1. For example, FIG. 1 depicts the finger grip 100 having two flexure bearings 1630 facing opposite each other.

In particular embodiments, the flexure bearing 1630 may include a cap attachment section 1602, two arm segments 1604 extending from the cap attachment section 1602, and respective base attachment sections 1606 on each arm segment 1604. In particular embodiments, each arm segment 1604 may include an upper arm section 1610 coupled to the cap attachment section 1602, a lower arm section 1612 coupled to the base attachment section 1606, and one or more middle hinges 1616 coupling the upper arm section 1610 to the lower arm section 1612. As an example and not by way of limitation, the lower arm section 1612 may be longer than the upper arm section 1610. In this way, when the finger grip is deployed in the one-finger mode, a relatively large lower opening may be formed between the lower arm sections such that the user may easily insert a single finger through the lower opening. In particular embodiments, each arm segment 1604 may be split into a fork-like configuration, with three fingers 1621 extending from a fork neck 1622 of the lower arm section 1612 to the upper arm section 1610 through three middle hinges 1616. The fingers 1621 may be spaced apart from one another by one or more gaps 1623. As an example and not by way of limitation, each gap 1623 of the arm segment 1604 may be configured to receive the finger of another oppositely-facing arm segment, e.g., in a manner that accommodates various ranges of motion of the finger such as between the captured position and the non-captured position. It should be understood that although this disclosure describes an arm segment in a particular manner, this disclosure contemplates arm segments in any suitable manner. For example, the arm segment may include any suitable number of fingers, gaps, or middle hinges, such as one, two, four, five, or more. In some embodiments, by providing multiple (e.g., three as shown) middle hinges, the flexure bearing may appear more aesthetically pleasing and may be more comfortable for use (e.g., especially for one-finger mode) as the arm segment is less rigid. Moreover, since the hinge points are comparatively smaller, stress marks (such as white wear lines) that may develop over time are made less visible, which may help promote user experience and boost user confidence in the durability of the product.

In particular embodiments, the two arm segments 1604 may be connected to the cap attachment section 1602 via one or more upper hinges 1618 and to the base attachment section 1606 via one or more lower hinges 1620. In the example where the arm segment 1604 is split into three fingers 1621, upper ends of the three fingers 1621 may be connected to the cap attachment section 1602 via three upper hinges 1618, and a lower end of the fork neck 1622 may be connected to the base attachment section 1606 via one lower hinge 1620. In particular embodiments, the cap attachment section 1602 may be configured to attach to a cap of a finger grip (such as the cap assembly 140), and the base attachment section 1606 may be configured to attach to a base of a finger grip (such as the base 110). In particular embodiments, the attachment of the cap attachment section 1602 and/or the base attachment section 1606 may be implemented without using adhesives. As an example and not by way of limitation, the cap attachment section 1602 may be held (e.g., molded or welded) between a first plate (such as the first plate 143) and a second plate (such as the second plate 144) of the cap, and the base attachment section 1606 may be held (e.g., molded or welded) between a retainer plate (such as the retainer plate 122) and a backing plate (such as the backing plate 150) of the base or otherwise coupled to a hub of the base (such as coupled between the first side and second side of the hub 114). Although this disclosure describes a finger grip with a flexure bearing in a particular manner, this disclosure contemplates finger grips with any suitable flexure bearings in any suitable manner including any suitable manner of attaching the flexure bearing to the finger grip.

It will be appreciated that the flexure bearing 1630 represents an example flexure bearing and other embodiments may be implemented differently. For example, in some cases, the cap attachment section 1602 may be implemented as two or more cap attachment sections, such as one cap attachment section for each arm segment 1604. As another example, the base attachment section 1606 may be implemented as a single base attachment section attached to each arm segment 1604. As a further example, the flexure bearing 1630 may include a different number of arm segments, such as one arm segment, three arm segments, or more.

In particular embodiments, any of the hinges 1616, 1618, 1620 may include a thinned portion 1022 have a thickness that is thinner than a thickness of the upper arm section 1610 or thinner than a thickness of the lower arm section 1612. In particular embodiments, any of the hinges 1616, 1618, 1620 may provide force and/or motion transmission via the upper and/or lower arm sections 1610, 1612 to move the cap attachment section 1602 and/or the base attachment section 1606, which may be attached to a cap and a base, respectively. In particular embodiments, any of the hinges 1616, 1618, 1620 may provide force and motion transmission via the upper and lower arm sections 1610, 1612 to move the cap assembly 140 between the captured position and the non-captured position through elastic body deformation. In some cases, one or more of the hinges 1616, 1618, 1620 is a unitary structure formed with the respective upper arm section 1610, the lower arm section 1612, the cap attachment section 1602, and the base attachment section 1606 such that the flexure bearing 1630 as whole may form a unitary structure made of the same material.

In particular embodiments, one or more of the hinges 1616, 1618, 1620 may be made of material having a "state memory" effect. As an example, the material may essentially reset its natural position (such as the "inward bend" position illustrated in FIG. 16) when forced into a state for a period of time. In some cases, the memory effect may get stronger as time in this state increases. As another example, the memory effect may change over time/cycles/conditions logarithmically. In particular embodiments, because the range of motion of one or more hinges 1616, 1618, 1620 may all vary considerably for the various modes, maintaining the desired function may be a delicate balance between the hinges 1616, 1618, 1620. In some examples, one or more of the hinges 1616, 1618, 1620 may be made of polypropylene.

In particular embodiments, one or more of the hinges 1616, 1618, 1620 may each serve a different purpose and have a different range of motion. In particular embodiments, the upper hinge 1618 may have a nearly 180-degree range of motion. As an example and not by way of limitation, when closed or captured, the upper hinge 1618 may be at 0 degrees (or flat, as molded in its natural state). As another example, when opened or non-captured, the upper hinge 1618 may be roughly 90 degrees. As a further example, when in stand mode, the upper hinge 1618 may be roughly 180 degrees. In particular embodiments, because the upper hinge 1618 in the closed state is its natural state, it has little to no bearing on how it affects the push-to-open functionality. Unless it is stuck into the stand state for an extended time, it will naturally tend to be flat/closed. As such, in particular embodiments, the upper hinge 1618 may be made or molded as thin as possible (while maintaining durability) to reduce the memory effect. As an example and not by way of limitation, the upper hinge 1618 may have a thickness in the range between 0.2 mm and 0.5 mm or other suitable ranges.

In particular embodiments, the middle hinge 1616 may have the largest range of motion and largest deviation from the molded/natural state to the closed state (where the grip will spend most of its time). As an example and not by way of limitation, the middle hinge 1616 may be molded at a 0-degree (flat) state. When installed into the grip and the grip closed, the middle hinge 1616 may be at 180 degrees. This deviation may create a perpetual "open force". As another example and not by way of limitation, the middle hinge 1616 may also go to 270 degrees when used in one-finger mode. Because of the large range of motion required by the middle hinge 1616, the geometry of the hinge should be optimized to reduce strain on the material which causes it to lose its memory. To alleviate this and reduce material strain, in particular embodiments, the middle hinge 1616 may be configured with reduced thickness. Additionally or alternatively, the middle hinge 1616 may be elongated to increase its bend radius.

In particular embodiments, the lower hinge 1620 may have the lowest range of motion and may be under-utilized. As an example and not by way of limitation, the full range of motion of the lower hinge 1620 may be 0 to 90 degrees. In particular embodiments, the lower hinge 1620 may be molded at 0 degree. Alternatively, in particular embodiments, if molded at 30 or 40 degrees, the lower hinge 1620 might be able to sustain this perpetual open force by not overstraining due to it being molded in the middle of a fairly narrow range of motion. This may also facilitate the one-finger mode.

In particular embodiments, the flexure bearing 1630 may go through a "pre-bending" process after molding and/or before final assembly. This may give the hinges 1616, 1618, 1620 as well as other components of the flexure bearing 1630 a more natural state that influences the biases a lot less, e.g., to help make the push-to-open functionality more successful.

Particular embodiments on the hinge and arm designs of this disclosure may prevent damage during normal use and range of motion and repetitions. Moreover, it may be possible to achieve long-term repeatability for the push-to-open and push-to-close functions. Other advantages are also envisaged by this disclosure and will become apparent to one of skill in the art in light of this disclosure.

Figure 17A:
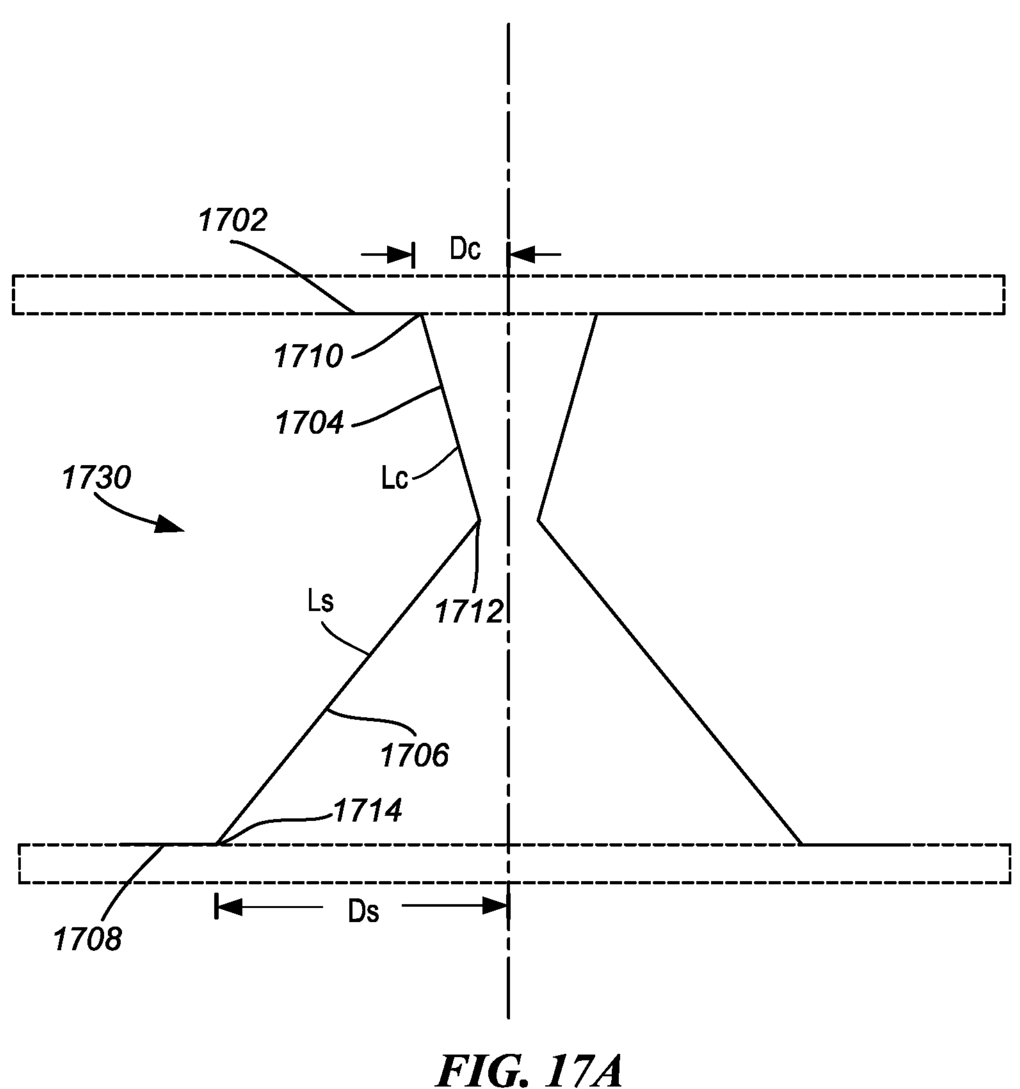
FIGS. 17A-17C illustrate example configurations and dimensions of the flexure bearing.
Figure 17B:
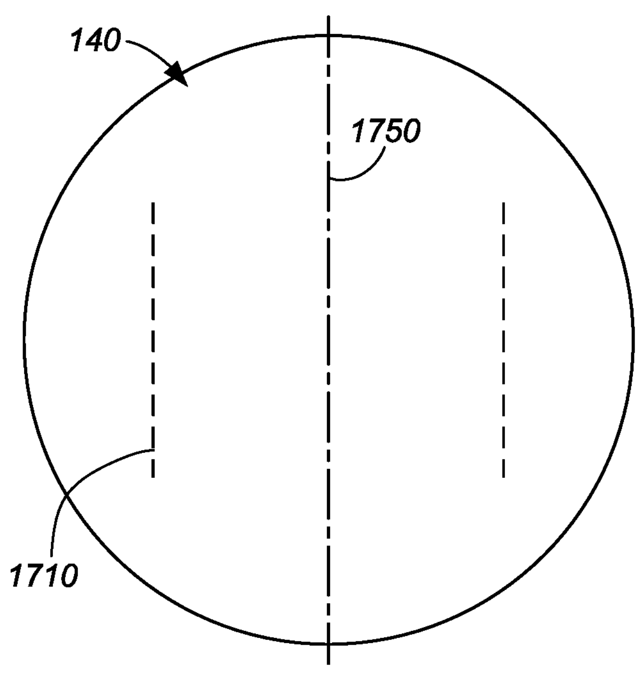
Figure 17C:
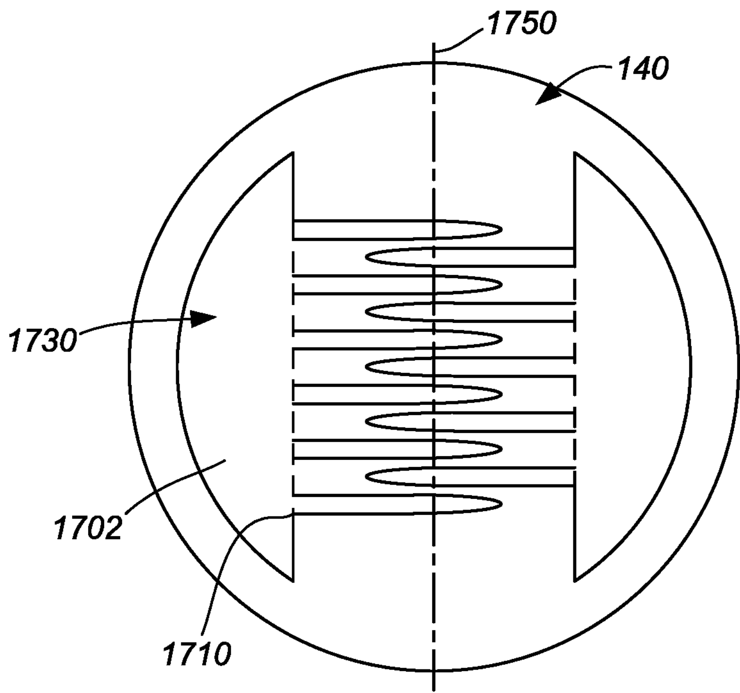

FIGS. 17A-17C illustrate example configurations and dimensions of a flexure bearing 1730. For example, the flexure bearing 1730 may be an embodiment of a flexure bearing 1630 of FIG. 16. For example, FIG. 17A schematically depicts a side view of two flexure bearings 1630 facing opposite each other in the non-captured position. FIGS. 17B-17C schematically depict top views of the cap assembly 140, with FIG. 17C specifically showing the flexure bearings 1730 folded in the captured position. While shown as having two flexure bearings, for the sake of simplicity, the following is described by referencing only one flexure bearing, i.e., the arm shown on the left of FIG. 17A.

In particular embodiments, the flexure bearing 1730 may include four body sections, namely, a cap attachment section 1702, an upper arm section 1704, a lower arm section 1706, and a base attachment section 1708, which may be connected (e.g., in series) by three hinges, i.e., an upper hinge 1710, a middle hinge 1712, and a lower hinge 1714, respectively. While described as being a hinge, other suitable features for connecting the body sections together may be similarly employed, such as a folding segment or the like.

In particular embodiments, the cap attachment section 1702 may be coupled to a cap of a finger grip such as the cap assembly 140 of the finger grip 100 described at length above. For example, the cap attachment section 1702 may be immovably attached (for example, by using adhesives, molding, etc.) or movably attached (for example, via connectors or the like) to the cap.

In particular embodiments, the upper arm section 1704 may be connected to the cap attachment section 1702 by the upper hinge 1710 and may have a length $L_c$. As an example and not by way of limitation, the length $L_c$ of the upper arm section 1704 may have a value ranging from 2 to 25 mm in length measured from the connection with the cap attachment section 1702 (e.g., a center of pivot or folding portion of the upper hinge 1710) to the connection with the lower arm section 1706 (e.g., a center of pivot or folding portion of the middle hinge 1712.)

In particular embodiments, the lower arm section 1706 may be connected to the base attachment section 1708 by the lower hinge 1714 and may have a length $L_s$. As an example and not by way of limitation, the length $L_s$ of the lower arm section 1706 may have a value ranging from 2 to 25 mm in length measured from the connection with the upper arm section 1704 (e.g., a center of pivot or folding portion of the middle hinge 1712) to the connection with the base attachment section 1708 (e.g., a center of pivot or folding portion of the lower hinge 1714.)

In particular embodiments, the base attachment section 1708 may be coupled to a base of the finger grip such as the base 110 of the finger grip 100 described at length above. For example, the base attachment section 1708 may be immovably attached (for example, by using adhesives, molding, etc.) or movably attached (for example, via connectors or the like) to the base.

In particular embodiments, a distance $d_c$ may be formed between the center of pivot or folding portion of the upper hinge 1710 and a vertical axis of the center or centerline of the cap. With particular reference to FIGS. 17B and 17C, the vertical axis of the center or centerline of the cap may be the line 1750 that runs parallel to the upper hinge 1710. As an example and not by way of limitation, the distance $d_c$ may have a value ranging from 5 to 25 mm.

In particular embodiments, a distance $d_s$ may be formed between the center of pivot or folding portion of the lower hinge 1714 and a vertical axis of the center or centerline of the base. Similar to the line 1750 of the cap, the vertical axis of the center or centerline of the base may be the line that runs parallel to the lower hinge 1714. As an example and not by way of limitation, the distance $d_s$ may have a value ranging from 5 to 25 mm.

In particular embodiments, the distance $d_c$ may be smaller than the distance $d_s$. In particular embodiments, the length $L_c$ may be smaller than the length $L_s$.

In particular embodiments, the lengths $L_c$, $L_s$ and the distances $d_c$, $d_s$ may satisfy the following relationship:

$$L_s = L_c + (d_s - d_c) \tag{1}$$

Alternatively, in particular embodiments, the lengths $L_c$, $L_s$ and the distances $d_c$, $d_s$ may satisfy the following relationship:

$$\text{abs}(L_s - L_c - d_s + d_c) \leq 5\ \text{mm} \tag{2}$$

For example, this may allow for increased tolerance of the constraint to accommodate variations in product dimensions while still ensuring closing of the finger grip (e.g., to the captured position) due to stretching of the flexure bearing 1730.

In particular embodiments, the lengths $L_c$, $L_s$ and the distances $d_c$, $d_s$ may satisfy one of the following conditions:

$$\text{if } d_s = d_c, \text{ then } 30\ \text{mm} > L_s + L_c > 15\ \text{mm}, \tag{3}$$

-continued $$\text{if } d_s \neq d_c, \text{ then } \sqrt{(L_c + L_s)^2 - (d_s + d_c)^2} > 15 \text{ mm} \quad (4)$$

It should be noted that the numbers (e.g., 5, 15, and 30) in the above relationships are expressed in millimeters and are determined based on a finger height. As an example, a value less than 15 mm may not allow for a finger taller than 15 mm to enter between the arms. As another example, a value greater than 30 mm may be too large and uncomfortable for users to hold the finger grip.

Although this disclosure describes a finger grip with a particular arm having particular dimensions in a particular manner, this disclosure contemplates finger grips with any suitable arms having any suitable dimensions in any suitable manner.

Although this disclosure describes a finger grip with a particular component in a particular manner, this disclosure contemplates finger grips with any suitable components in any suitable manner. For example, in particular embodiments, the hub, the cap, the base, the arms, or other parts of the finger grip can be replaced by the user allowing them to change colors or designs of their grip to suit their interests. As another example, in particular embodiments, there may be a hinge built into the frame or hub which would allow the user to pivot the entire grip out of the way of a transmitting coil used during wireless charging while still remaining connected to the phone or phone case or other portable devices.

FIGS. 18-19 show cross-sectional views of the finger grip 100 in the captured position, particular showing features of the cap assembly 140 and the base 110 that may facilitate the push-to-open functionality. In particular embodiments, the sloped portion 146 may be configured at a lower surface of the cap assembly 140 that faces the base 110. As an example and not by way of limitation, a portion of a lower surface of the first plate 143 may be sloped, and a portion of a lower surface of the second plate 144 may also be sloped, which together form the sloped portion 146. Alternatively, the sloped portion 146 may be separately provided at the first plate 143 or the second plate 144. In the captured position of the finger grip 100, the sloped portion 146 may be inclined upward relative to the base 110. When a user presses down on the top of the cap assembly 140 near its edge (as indicated by the arrow Fx), the sloped portion 146 may be caused to substantially contact the base 110, rotating about the base 110 to initiate a lever action. In other words, the sloped portion 146 may serve as a fulcrum, lifting up an opposite end of the cap assembly 140 to assist in separating the cap assembly 140 from the base 110. The lever action provided by the sloped portion 146 may work together with the resiliently extending flexure bearings 160 and/or the repelling force of the first and second magnetic components 502, 504 to raise the cap assembly 140 from base 110. This may improve the case of manipulating the finger grip 100 from the captured mode into the non-captured or stand modes as desired.

Additionally or alternatively, in particular embodiments, although not shown, the base 110 may include a sloped portion, which may be downwardly inclined. As an example and not by way of limitation, the sloped portion of the base 110 may be configured on the hub 114 and face the cap assembly 140. For example, the sloped portion of the base 110 may cooperate with the sloped portion 146 of the cap assembly 140 to provide a greater degree of lever action to cantilever the cap assembly 140.

In particular embodiments, the slope of the sloped portion 146 may be designed to provide the cap assembly 140 with a sufficient range of motion toward the base 110 such that the available travel distance (e.g., the distance between the edge of the cap assembly 140 and the base 110) may allow the cap assembly 140 to be sufficiently angled to initiate extension of the flexure bearings 160 and/or escape the attraction force of the first and second magnetic components 502, 504. As an example and not by way of limitation, the available travel distance may allow the cap assembly 140 to be angled at a degree θ of about 5, 10, 15, 20, 25, 30, 35, 40, 45, 50, 55, 60, 65, 70 degrees or more (+/−about a few degrees).

Figure 20:
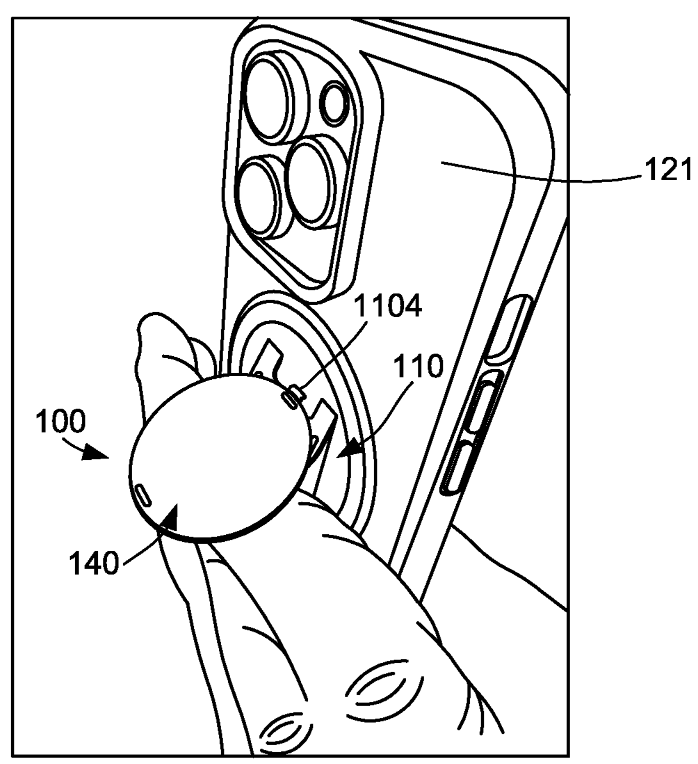
FIGS. 20-21 illustrate additional example use of the finger grip for holding a smartphone.
Figure 21:
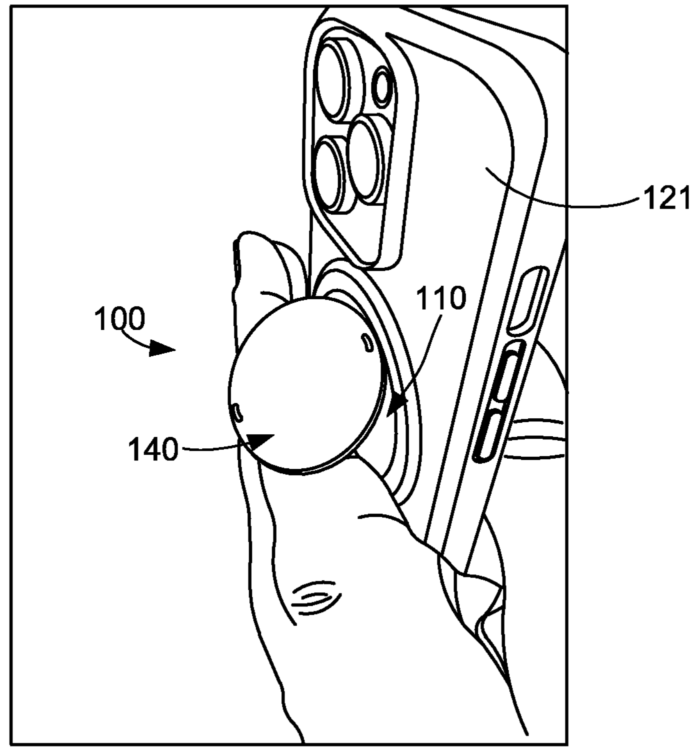

FIGS. 20-21 illustrate additional example use of the finger grip 100 for holding the smartphone 121. In particular, FIG. 20 illustrates the stand position of the finger grip 100 where an edge of the cap assembly 140 is engaged with and caught by the engagement feature 1104 of the base 110. For example, this position may allow the finger grip 100 to basically function as a kickstand to support the smartphone 121. FIG. 21 illustrates the shelf position of the finger grip 100 where an edge of the cap assembly 140 is positioned against the base 110 without engaging with the engagement feature 1104 of the base 110. For example, in the shelf position, at least one of the flexure bearings 160 may be fully extended to an extent where the middle hinge becomes flat. This may allow the user to rest the fingers with the cap assembly 140 on one side, and the extended flexure bearing 160 on the other side of the fingers.

Figure 22:
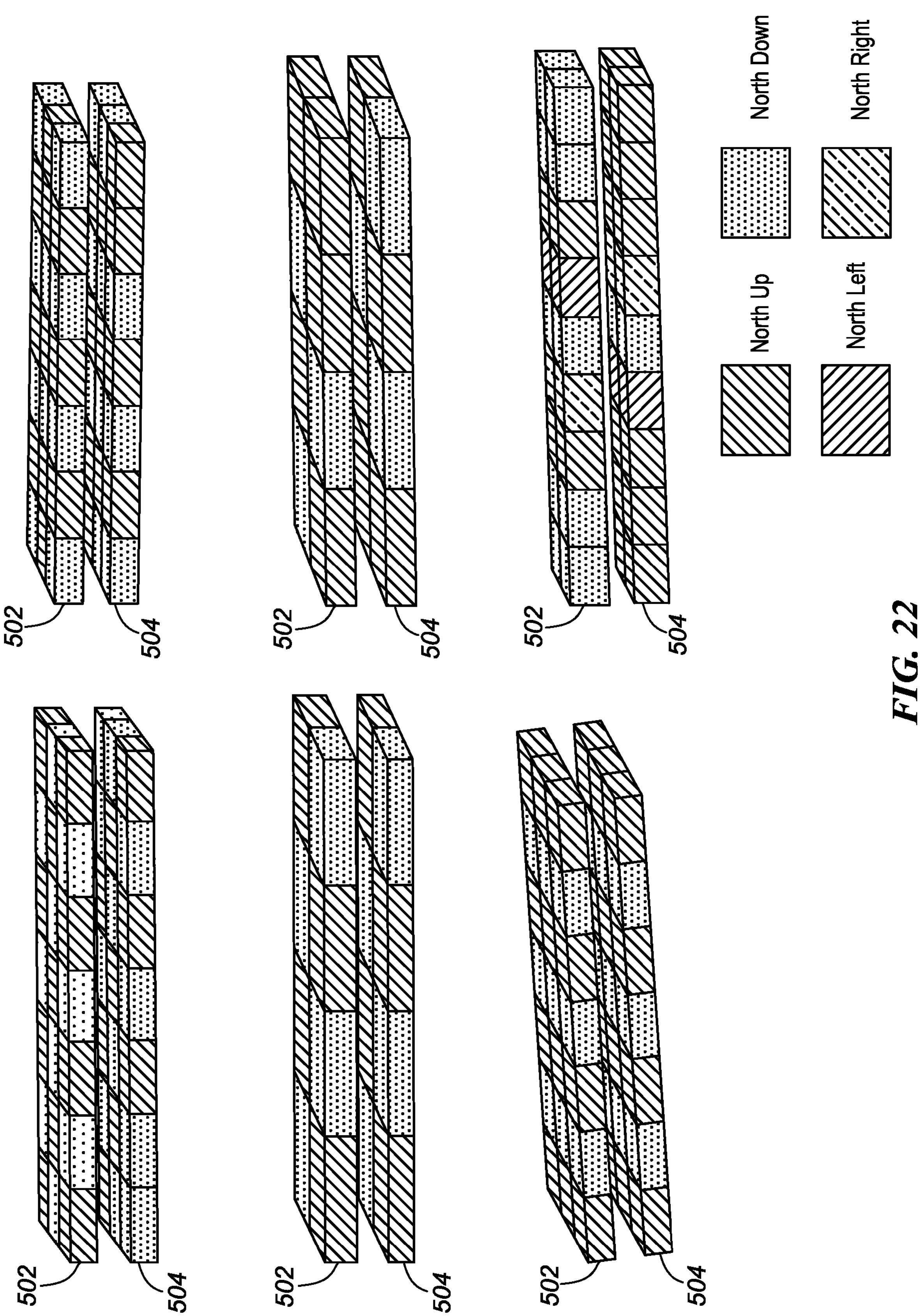
FIG. 22 illustrates example configurations of magnetic components of the finger grip.

FIG. 22 illustrates other example variations of the first and second magnetic components 502, 504 of the cap assembly 140 and the base 110 according to this disclosure. As depicted, in particular embodiments, the first and second magnetic components 502, 504 may each include a plurality of magnet segments with a particular grid shape, size, pole orientation, and so forth. For example, the first and second magnetic components 502, 504 may have the same, similar, or different arrangements and numbers of magnet segments. For example, the poles of the magnet segments may be configured with various orientations, e.g., with north pole(s) facing up, down, right, left, etc. For example, corresponding pairs of magnet segments of the first and second magnetic components 502, 504 may be configured to attract or repel, or be configured with the same or different polarity and/or magnetic strength. The illustrated embodiments are provided as examples only and are not an exhaustive list of all possible variations according to this disclosure. Although this disclosure describes a grip with a particular magnetic component in a particular manner, this disclosure contemplates grips with any suitable magnetic components in any suitable manner.

Recitation of Embodiments

Embodiment 1: A grip for coupling to a portable handheld device, the grip including: a base; a cap assembly; and at least two flexure bearings connecting the base and the cap assembly, each flexure bearing including: a cap attachment section; an upper arm section; a lower arm section; a base attachment section; an upper hinge connecting between the cap attachment section and the upper arm section; a middle hinge connecting between the upper arm section and the lower arm section; and a lower hinge connecting between the lower arm section and the base attachment section; wherein the cap attachment section is attached to the cap assembly such that a distance $d_c$ is formed between the upper hinge and a centerline of the cap assembly; wherein the base attachment section is attached to the base such that a distance $d_s$ is formed between the lower hinge and a centerline of the base; wherein the distance $d_c$ is smaller than the distance $d_s$, and a length $L_c$ of the upper arm section is smaller than a length $L_s$ of the lower arm section.

Embodiment 2: The grip of Embodiment 1, wherein the distance $d_c$, the distance $d_s$, the length $L_c$, and the length $L_s$ satisfy:

$$\text{abs}(L_s - L_c - d_s + d_c) \leq 5 \text{ mm}.$$

Embodiment 3: The grip of any one of Embodiments 1-2, wherein, when $d_s=d_c$, then:

$$mm > L_s + L_c > 15$$

Embodiment 4: The grip of any one of Embodiments 1-3, wherein, when $d_s \neq d_c$, then:

$$30 \text{ mm} > \sqrt{(L_c + L_s)^2 - (d_s - d_c)^2}.$$

Embodiment 5: The grip of any one of Embodiments 1-4, wherein the length $L_c$ has a value ranging from 2 mm to 25 mm, wherein the length $L_s$ has a value ranging from 2 mm to 25 mm, wherein the distance $d_s$ has a value ranging from 5 mm to 25 mm, and wherein the distance de has a value ranging from 5 mm to 25 mm.

Embodiment 6: The grip of any one of Embodiments 1-5, wherein the cap assembly is configured to be movable relative to the base to a non-captured position in which the cap assembly is spaced from the base, and wherein, when in the non-captured position, the at least two flexure bearings are configured to be movable between a first position in which the middle hinges bend inward toward each other, and a second position in which the middle hinges bend outward away from each other.

Embodiment 7: The grip of any one of Embodiments 1-6, wherein the base includes a tab or a slot, and wherein the cap assembly is configured to be movable relative to the base to a stand position in which an edge of the cap assembly is engaged with the tab or the slot of the base.

Embodiment 8: The grip of any one of Embodiments 1-7, wherein the cap assembly includes a first plate and a second plate coupled to the first plate.

Embodiment 9: The grip of any one of Embodiments 1-8, wherein the first plate and the second plate are coupled together by ultrasonic welding.

Embodiment 10: The grip of any one of Embodiments 1-9, wherein at least a portion of the cap attachment section of the flexure bearing is held between the first plate and the second plate.

Embodiment 11: The grip of any one of Embodiments 1-10, wherein the cap assembly includes a sloped portion that faces the base.

Embodiment 12: The grip of any one of Embodiments 1-11, wherein the cap assembly is configured to be movable relative to the base such that when the sloped portion moves to contact the base, the sloped portion initiates a lever action.

Embodiment 13: The grip of any one of Embodiments 1-12, wherein each flexure bearing is configured to resiliently extend to move the cap assembly away from the base upon the lever action.

Embodiment 14: The grip of any one of Embodiments 1-13, wherein the base includes a sloped portion that faces the cap assembly.

Embodiment 15: The grip of any one of Embodiments 1-14, wherein the cap assembly is configured to be movable relative to the base such that when the cap assembly moves to contact the sloped portion of the base, the sloped portion initiates a lever action.

Embodiment 16: The grip of any one of Embodiments 1-15, wherein the base is rotatably coupled to a frame, and wherein the frame is configured for coupling to the portable handheld device.

Embodiment 17: The grip of any one of Embodiments 1-16, wherein the base is coupled to the frame via a groove-and-protrusion assembly.

Embodiment 18: The grip of any one of Embodiments 1-17, wherein the base is magnetically coupled to the frame via one or more poly magnets, and wherein the base is rotatable to a plurality of discrete positions relative to the frame.

Embodiment 19: The grip of any one of Embodiments 1-18, wherein the base is removably coupled to the frame.

Embodiment 20: The grip of any one of Embodiments 1-19, wherein the frame is made of highly conductive metal.

Embodiment 21: The grip of any one of Embodiments 1-20, wherein the cap assembly includes one or more location-indicating nubs configured to provide tactile feedback to a user.

Embodiment 22: The grip of any one of Embodiments 1-21, wherein each location-indicating nub includes a spring mechanism that is configured to allow the location-indicating nub to deflect into the cap assembly.

Embodiment 23: The grip of any one of Embodiments 1-22, wherein the centerline of the cap assembly extends parallel to the upper hinge, and wherein the centerline of the base extends parallel to the lower hinge.

Embodiment 24: A grip for coupling to a portable handheld device, the grip including: a base having a first magnetic component; a cap assembly having a first plate, a second plate coupled to the first plate, and a second magnetic component; and at least two flexure bearings connecting the base and the cap assembly; wherein at least a portion of each flexure bearing is held between the first plate and the second plate; wherein the first magnetic component and the second magnetic component are configured to attract at a first threshold distance to magnetically couple the cap assembly and the base together, and to repel or not attract at a second threshold distance to push the cap assembly away from the base; wherein each of the first magnetic component and the second magnetic component includes a plurality of poles and has a particular magnetic strength; wherein each of the first magnetic component and the second magnetic component is configured to maintain inductive coupling between the portable handheld device and a wireless charger.

Embodiment 25: The grip of Embodiment 24, wherein the first magnetic component and the second magnetic component are uncoated.

Embodiment, 26: The grip of any one of Embodiments 24-25, wherein the first magnetic component and the second magnetic component are coated in non-conductive material.

Embodiment 27: The grip of any one of Embodiments 24-26, wherein each of the plurality of poles has a different polarity from an adjacent pole.

Embodiment 28: The grip of any one of Embodiments 24-27, wherein each of the first magnetic component and the second magnetic component includes a poly magnet.

Embodiment 29: The grip of any one of Embodiments 24-28, wherein each of the first magnetic component and the second magnetic component includes a plurality of magnet segments.

Embodiment 30: The grip of any one of Embodiments 24-29, wherein each of the plurality of magnet segments is configured end-to-end with an adjacent magnet segment.

Embodiment 31: The grip of any one of Embodiments 24-30, wherein the plurality of magnet segments is arranged in a particular grid shape.

Embodiment 32: The grip of any one of Embodiments 24-31, wherein the first magnetic component is configured near a center of the base, and wherein the second magnetic component is configured near a center of the cap assembly.

Embodiment 33: The grip of any one of Embodiments 24-32, wherein the first magnetic component is configured around a perimeter of the base, and wherein the second magnetic component is configured around a perimeter of the cap assembly.

Embodiment 34: The grip of any one of Embodiments 24-33, wherein the second magnetic component is held between the first plate and the second plate of the cap assembly.

Embodiment 35: The grip of any one of Embodiments 24-34, wherein the first plate and the second plate are welded together.

Embodiment 36: The grip of any one of Embodiments 24-35, wherein the base is rotatably coupled to a frame, and wherein the frame is configured for coupling to the portable handheld device.

Embodiment 37: The grip of any one of Embodiments 24-36, wherein the first magnetic component is configured in the base.

Embodiment 38: The grip of any one of Embodiments 24-37, wherein the frame is made of highly conductive metal.

Embodiment 39: The grip of any one of Embodiments 24-38, wherein the cap assembly is configured to be movable relative to the base to a non-captured position in which the cap assembly is spaced from the base, and a captured position in which the cap assembly contacts the base.

Embodiment 40: The grip of any one of Embodiments 24-39, wherein, when in the captured position, the first magnetic component and the second magnetic component are configured to be separated from each other by a predetermined distance.

Embodiment 41: The grip of any one of Embodiments 24-40, wherein the predetermined distance is about 0 to 3 mm.

Embodiment 42: The grip of any one of Embodiments 24-41, wherein each of the first magnetic component and the second magnetic component is grade N48, N52, N54H, or N54M.

Embodiment 43: The grip of any one of Embodiments 24-42, wherein each of the first magnetic component and the second magnetic component is a neodymium magnet, a ferrite magnet, or a samarium cobalt magnet.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A grip for coupling to a portable handheld device, the grip comprising:
- a base;
- a cap assembly comprising a first plate and a second plate coupled to the first plate; and
- at least two flexure bearings connecting the base and the cap assembly, each flexure bearing comprising:
  - a cap attachment section;
  - an upper arm section;
  - a lower arm section;
  - a base attachment section;
  - an upper hinge connecting between the cap attachment section and the upper arm section;
  - a middle hinge connecting between the upper arm section and the lower arm section; and
  - a lower hinge connecting between the lower arm section and the base attachment section;
- wherein at least a portion of the cap attachment section of the flexure bearing is held between the first plate and the second plate, wherein the cap attachment section is attached to the cap assembly such that a distance $d_c$ is formed between the upper hinge and a centerline of the cap assembly;
- wherein the base attachment section is attached to the base such that a distance $d_s$ is formed between the lower hinge and a centerline of the base;
- wherein the distance $d_c$ is smaller than the distance $d_s$, and a length $L_c$ of the upper arm section is smaller than a length $L_s$ of the lower arm section.

2. The grip of claim 1, wherein the distance $d_c$, the distance $d_s$, the length $L_c$, and the length $L_s$ satisfy:

$$\text{abs}(L_s - L_c - d_s + d_c) \leq 5 \text{ mm}.$$

3. The grip of claim 1, wherein, when $d_s = d_c$, then:

$$30\ \text{mm} > L_s + L_c > 15\ \text{mm}.$$

4. The grip of claim 1, wherein, when $d_s \neq d_c$, then:

$$30\ \text{mm} > \sqrt{(L_c + L_s)^2 - (d_s - d_c)^2}.$$

5. The grip of claim 1, wherein the length $L_c$ has a value ranging from 2 mm to 25 mm, wherein the length $L_s$ has a value ranging from 2 mm to 25 mm, wherein the distance $d_s$ has a value ranging from 5 mm to 25 mm, and wherein the distance $d_c$ has a value ranging from 5 mm to 25 mm.

6. The grip of claim 1, wherein the cap assembly is configured to be movable relative to the base to a non-captured position in which the cap assembly is spaced from the base, and wherein, when in the non-captured position, the at least two flexure bearings are configured to be movable between a first position in which the middle hinges bend inward toward each other, and a second position in which the middle hinges bend outward away from each other.

7. The grip of claim 1, wherein the base comprises a tab or a slot, and wherein the cap assembly is configured to be movable relative to the base to a stand position in which an edge of the cap assembly is engaged with the tab or the slot of the base.

8. The grip of claim 1, wherein the first plate and the second plate are coupled together by ultrasonic welding.

9. The grip of claim 1, wherein the centerline of the cap assembly extends parallel to the upper hinge, and wherein the centerline of the base extends parallel to the lower hinge.

10. The grip of claim 1, wherein the base comprises a sloped portion that faces the cap assembly.

11. The grip of claim 10, wherein the cap assembly is configured to be movable relative to the base such that when the cap assembly moves to contact the sloped portion of the base, the sloped portion initiates a lever action.

12. The grip of claim 1, wherein the cap assembly comprises one or more location-indicating nubs configured to provide tactile feedback to a user.

13. The grip of claim 12, wherein each location-indicating nub comprises a spring mechanism that is configured to allow the location-indicating nub to deflect into the cap assembly.

14. The grip of claim 1, wherein the cap assembly comprises a sloped portion that faces the base.

15. The grip of claim 14, wherein the cap assembly is configured to be movable relative to the base such that when the sloped portion moves to contact the base, the sloped portion initiates a lever action.

16. The grip of claim 15, wherein each flexure bearing is configured to extend to move the cap assembly away from the base upon the lever action.

17. The grip of claim 1, wherein the base is rotatably coupled to a frame, and wherein the frame is configured for coupling to the portable handheld device.

18. The grip of claim 17, wherein the base is coupled to the frame via a groove-and-protrusion assembly.

19. The grip of claim 17, wherein the base is magnetically coupled to the frame via one or more magnets, and wherein the base is rotatable to a plurality of discrete positions relative to the frame.

20. The grip of claim 17, wherein the base is removably coupled to the frame.

21. The grip of claim 17, wherein the frame is made of conductive metal.

* * * * *